(12) United States Patent
Goman et al.

(10) Patent No.: US 8,850,783 B2
(45) Date of Patent: Oct. 7, 2014

(54) REEL MOWER WITH CUTTING UNITS HAVING YAW PIVOT STRUCTURE AT A NEGATIVE CASTER ANGLE

(71) Applicants: Gerald E. Goman, Spring Valley, WI (US); Ricky A. Galewski, Elysian, MN (US)

(72) Inventors: Gerald E. Goman, Spring Valley, WI (US); Ricky A. Galewski, Elysian, MN (US)

(73) Assignee: The Toro Company, Bloomington, MN (US)

( * ) Notice: Subject to any disclaimer, the term of this patent is extended or adjusted under 35 U.S.C. 154(b) by 0 days.

(21) Appl. No.: 13/959,227

(22) Filed: Aug. 5, 2013

(65) Prior Publication Data

US 2013/0312380 A1     Nov. 28, 2013

Related U.S. Application Data

(62) Division of application No. 12/999,776, filed as application No. PCT/US2009/049030 on Jun. 29, 2009, now Pat. No. 8,544,251.

(60) Provisional application No. 61/133,285, filed on Jun. 27, 2008.

(51) Int. Cl.
*A01D 34/42* (2006.01)
*A01D 75/30* (2006.01)
*A01D 34/44* (2006.01)
*A01D 43/063* (2006.01)

(52) U.S. Cl.
CPC .............. *A01D 34/44* (2013.01); *A01D 75/306* (2013.01); *A01D 43/063* (2013.01)

USPC .......................................................... 56/253

(58) Field of Classification Search
USPC ............... 56/253, 11.6, 7, 6, 11.9, 13.6, 15.2, 56/14.9
See application file for complete search history.

(56) References Cited

U.S. PATENT DOCUMENTS

| | | | |
|---|---|---|---|
| 2,099,902 A | | 11/1937 | Moyer et al. |
| 2,329,952 A | * | 9/1943 | Speiser .......................... 56/11.6 |
| 3,177,638 A | * | 4/1965 | Johnson ............................. 56/7 |
| 3,816,985 A | * | 6/1974 | Sorenson et al. ................... 56/7 |
| 3,824,772 A | * | 7/1974 | Sorenson et al. ................... 56/7 |
| 4,021,996 A | * | 5/1977 | Bartlett et al. ...................... 56/7 |
| 4,178,746 A | * | 12/1979 | Alley ............................... 56/53 |
| 4,183,195 A | * | 1/1980 | James ............................ 56/11.9 |
| 4,769,976 A | | 9/1988 | Bassett et al. |
| 4,972,664 A | * | 11/1990 | Frey ............................... 56/13.6 |
| 5,343,680 A | | 9/1994 | Reichen et al. |
| RE34,921 E | * | 5/1995 | Lamusga et al. .................... 56/7 |
| 5,623,817 A | | 4/1997 | Bricko et al. |

(Continued)

Primary Examiner — Árpád Fábián-Kovács
(74) Attorney, Agent, or Firm — James W. Miller

(57) ABSTRACT

A reel mower has a double A arm suspension that lowers a reel cutting unit into a cutting position in a tail down orientation and that levels the reel cutting unit out as it lifts the reel cutting unit into a transport position. The reel cutting unit yaws during turns about a substantially vertical axis having a negative caster angle. The suspension has clamps that can be flipped open or closed to quickly attach or detach the reel cutting unit. A drive motor can be quickly attached or detached to the reel cutting unit using a pivotal wire form. An active counterbalance system automatically offsets the increasing weight of a grass basket on the reel cutting unit to maintain quality of cut. The grass basket maintains a constant spacing relative to the reel cutting unit when the reel cutting unit pitches to improve clipping collection.

2 Claims, 29 Drawing Sheets

(56) References Cited

U.S. PATENT DOCUMENTS

| | | | |
|---|---|---|---|
| 5,628,169 A | 5/1997 | Stiller et al. | |
| 5,901,538 A * | 5/1999 | Vohl | 56/15.2 |
| 6,098,388 A * | 8/2000 | Davies | 56/249 |
| 6,341,478 B1 | 1/2002 | Sallstrom et al. | |
| 6,758,031 B2 * | 7/2004 | Franet et al. | 56/14.9 |
| 6,945,832 B2 * | 9/2005 | Roycroft | 440/12.52 |
| 7,658,056 B2 * | 2/2010 | Thompson et al. | 56/15.8 |
| 2002/0017086 A1 * | 2/2002 | Sallstrom et al. | 56/7 |

* cited by examiner

REEL MOWER WITH CUTTING UNITS HAVING YAW PIVOT STRUCTURE AT A NEGATIVE CASTER ANGLE

TECHNICAL FIELD

This invention relates to a reel mower having one or more reel cutting units that each comprises a rotatable cutting reel that sweeps grass against a sharpened bedknife for shearing the grass against the bedknife.

BACKGROUND OF THE INVENTION

Reel mowers having a self propelled mower frame and mounting a plurality of reel cutting units are well known for precision mowing of grass. In such mowers, the reel cutting units typically are self-supporting and roll over the ground during cutting using one or more ground engaging rollers carried on the reel cutting unit itself. A suspension mounts each such reel cutting unit to the mower frame so that the reel cutting units are propelled by motion of the mower frame. The suspension is designed to allow the reel cutting unit various degrees of freedom of motion relative to the suspension by means of which the reel cutting units can individually adapt themselves to the contours of the ground to provide a higher quality of cut.

In recent times, there has been an increasing focus on further improving the quality of cut. The goal is to cut the grass at low heights of cut with few or no discernible flaws of any type. Thus, to the extent prior art suspensions permitted reel cutting units to cut grass with any unevenness in the cut that could be seen by the visible eye, or the extent prior art grass collectors attached to such reel cutting units permitted grass clippings to fall out or be left on the cut grass path even in minute quantities, the customers of such equipment are becoming increasingly less tolerant of such imperfections. It would be an advance in the art to provide suspensions that allow the reel cutting units to provide a more uniform and even cut and to provide grass collection that minimizes or eliminates any stray clippings from being left on the cut grass path. This invention is directed in part to such improvements.

Another important aspect of such mowers is how easily they can be serviced. In this regard, certain of the reel cutting units, such as the center rear cutting unit in a triplex configuration, are generally located underneath the mower frame. Access to such a cutting unit is thus difficult. Moreover, the cutting units themselves can be difficult to remove from the rest of the mower, requiring that they be bolted or unbolted to the mower suspension. The same is true for the drive motors that might be attached to the reel cutting units to power the rotatable reels thereof. Thus, it would be a further advance in the art, and one to which this invention is also directed, to provide cutting units that can be quickly and easily detached from their suspensions, that have drive motors that can be quickly and easily detached from the cutting units, and to have a way to more easily access any obstructed cutting units, such as the center rear cutting unit mentioned above.

SUMMARY OF THE INVENTION

One aspect of this invention relates to a reel mower having a mower frame supported for rolling over the ground. A power source is carried on the mower frame. An operator's station is also carried on the mower frame for supporting an operator thereon. A plurality of reel cutting units is further carried on the mower frame. A suspension operatively connects each reel cutting unit to the mower frame. Each suspension for each reel cutting unit includes a pair of pivotal suspension arms comprising an upper suspension arm and an underlying lower suspension arm.

Another aspect of this invention relates to a reel mower of the general type noted above. In this aspect, the suspension instead of that set forth above includes instead a substantially vertical pivot axis about which the reel cutting unit pivots to permit the reel cutting unit to yaw relative to the mower frame during turns of the mower frame when the reel cutting unit is in engagement with the ground in a cutting position. The vertical pivot axis is inclined or canted relative to vertical at a negative angle that points rearwardly relative to the reel cutting unit and relative to vertical as one proceeds downwardly along the angle of inclination.

Yet another aspect of this invention relates to a reel mower of the general type noted above. In this aspect, the suspension instead of that set forth above includes a plurality of transversely spaced, pivotal clamps that tightly clamp the reel cutting unit against a remaining portion of the suspension when the clamps are tightened to thereby releasably attach the reel cutting unit to the remaining portion of the suspension. A tab or finger is provided that can be moved back and forth manually by an operator in opposite directions to loosen and tighten each pivotal clamp without using a tool to thereby allow the reel cutting unit to be quickly detached from and attached to the remaining portion of the suspension, respectively.

An additional aspect of this invention relates to a reel mower of the general type noted above. In this aspect, the suspension instead of that set forth above includes a cutting unit carrier frame that pivotally connects to the cutting unit frame such that the reel cutting unit pitches fore and aft relative to the cutting unit carrier frame about a substantially horizontal pitch axis. A grass basket is provided having an open mouth through which the grass clippings are thrown into the grass basket for collection therein. The grass basket is pivotal on the cutting unit carrier frame such that gravity acting on the grass basket causes the grass basket to pivot towards the reel of the reel cutting unit during operation of the reel cutting unit. At least a portion of the grass basket abuts against a portion of the cutting unit carrier frame to maintain a lower lip of the open mouth of the grass basket at a predetermined clearance to the cutting reel with such clearance remaining substantially constant even as the reel cutting unit pitches back and forth about the pitch axis.

One more aspect of this invention relates to a reel mower of the general type noted above. In this aspect, the suspension instead of that set forth above simply operatively connects the reel cutting unit to the mower frame. A grass basket is provided for collecting grass clippings cut by the reel cutting unit. The grass basket has a weight that increases with the amount of grass clippings held in the grass basket. The grass basket is operatively connected to a cutting unit frame of the reel cutting unit in a manner that transfers the weight of the grass basket to the reel cutting unit such that the weight of the reel cutting unit is borne by the cutting unit as the cutting unit rolls on the ground. A counterbalance system offsets increasing weight of the grass basket. The counterbalance system comprises at least one biasing member for applying a biasing force to the suspension in a direction that tends to counterbalance the weight of the reel cutting unit including the weight of the grass basket, a sensor for detecting increasing weight of the grass basket due to the grass basket becoming more loaded with grass clippings, and an actuator responsive to the sensor for acting on the biasing member to increase the biasing force to counteract increasing weight of the grass basket.

BRIEF DESCRIPTION OF THE DRAWINGS

This invention will be described more completely in the following Detailed Description, when taken in conjunction with the following drawings, in which like reference numerals refer to like elements throughout.

DETAILED DESCRIPTION

The Overall Mower

Figure 1:
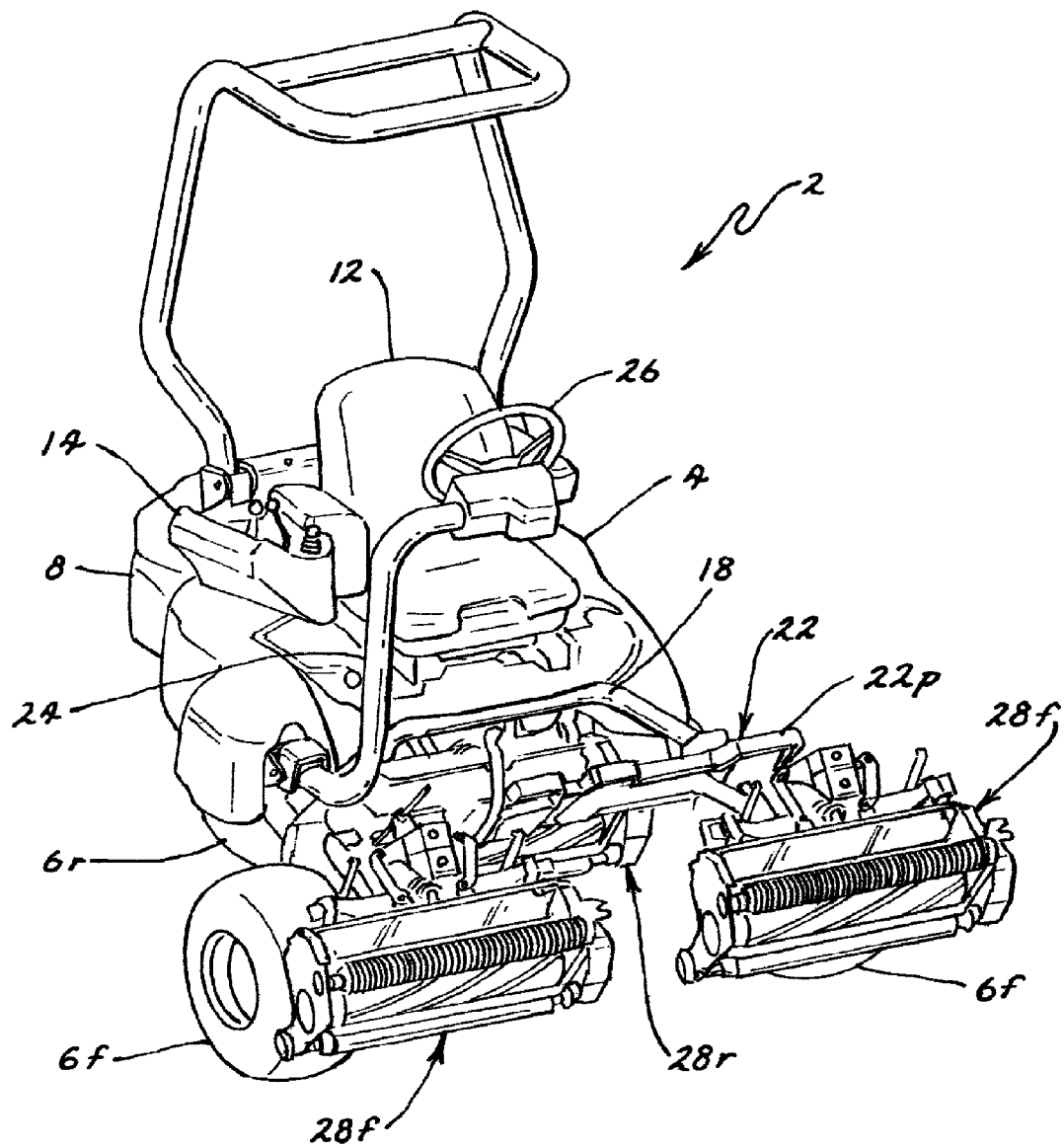
FIG. 1 is a perspective view of one embodiment of a reel mower according to this invention, namely a riding greensmower, particularly illustrating a triplex riding greensmower with the two front reel cutting units and the center rear reel cutting unit being disposed in a tipped up, elevated service position.
Figure 2:
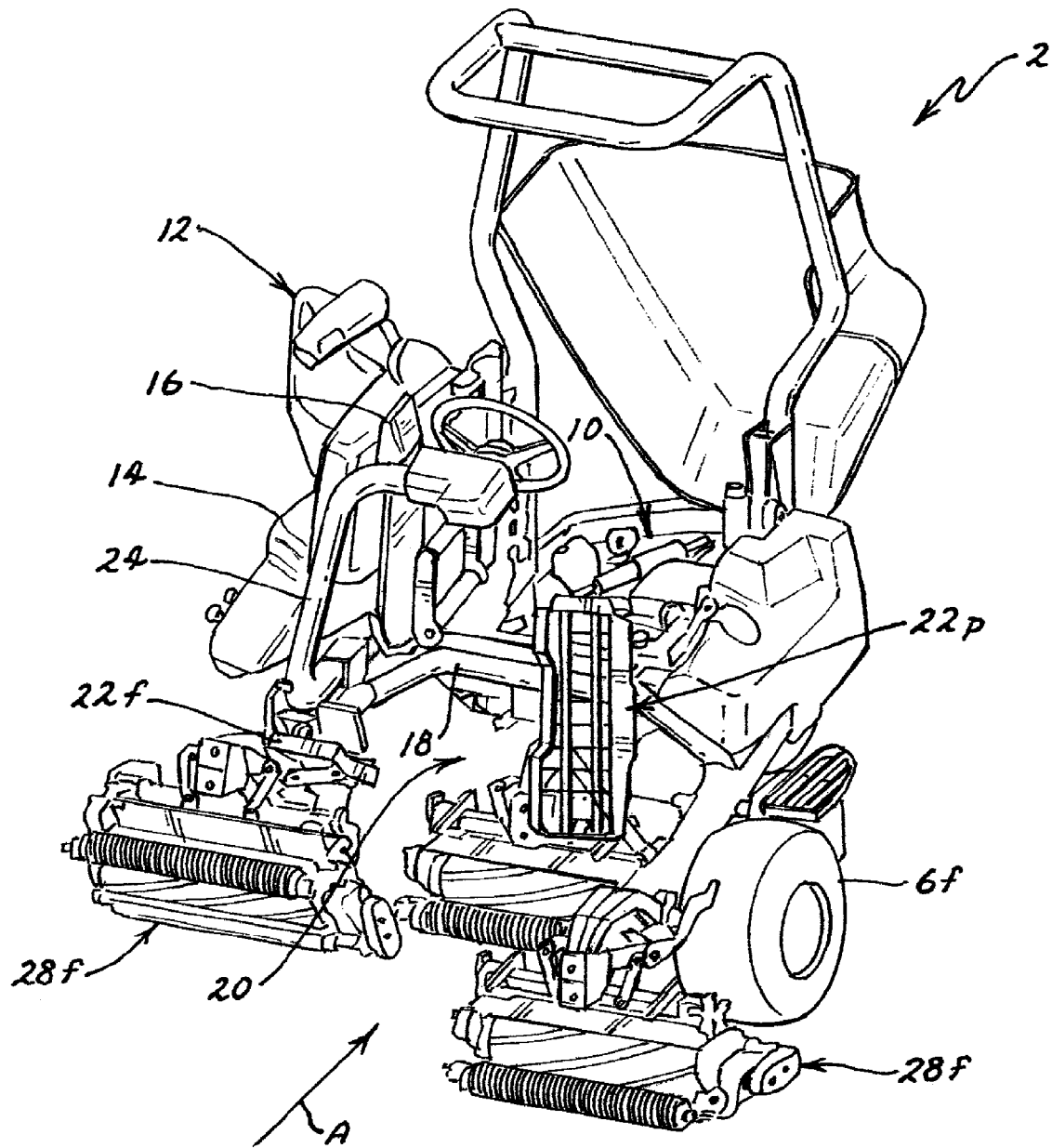
FIG. 2 is another perspective view of the mower of FIG. 1, particularly illustrating a pivotal floorboard section having been pivoted to the side to allow access to the center rear cutting unit from between the front cutting units and particularly illustrating the seat and control console of the operator's station having been pivoted to the side and the rear engine hood having been pivoted to the rear to allow access to the engine compartment of the mower.
Figure 3:
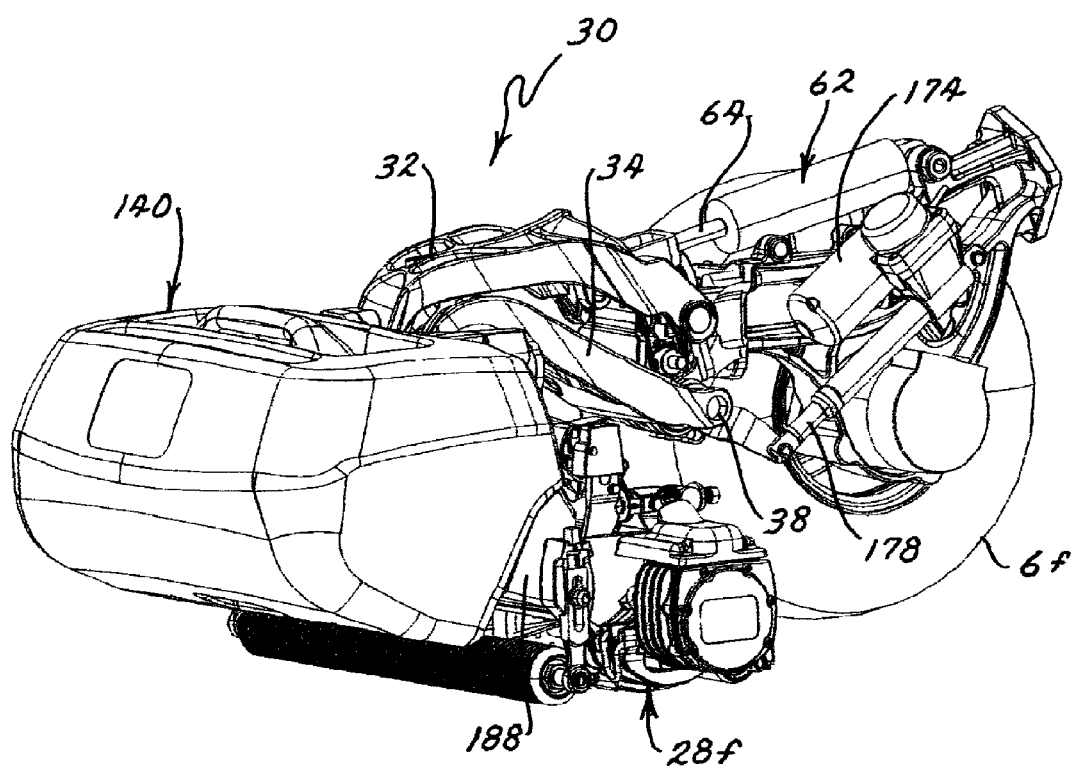
FIG. 3 is a perspective view of a portion of the mower of FIG. 1, particularly illustrating the right front tire of the mower and the right front reel cutting unit with the grass basket attached to the reel cutting unit and with the reel cutting unit being disposed in a lowered, operative cutting position.
Figure 4:
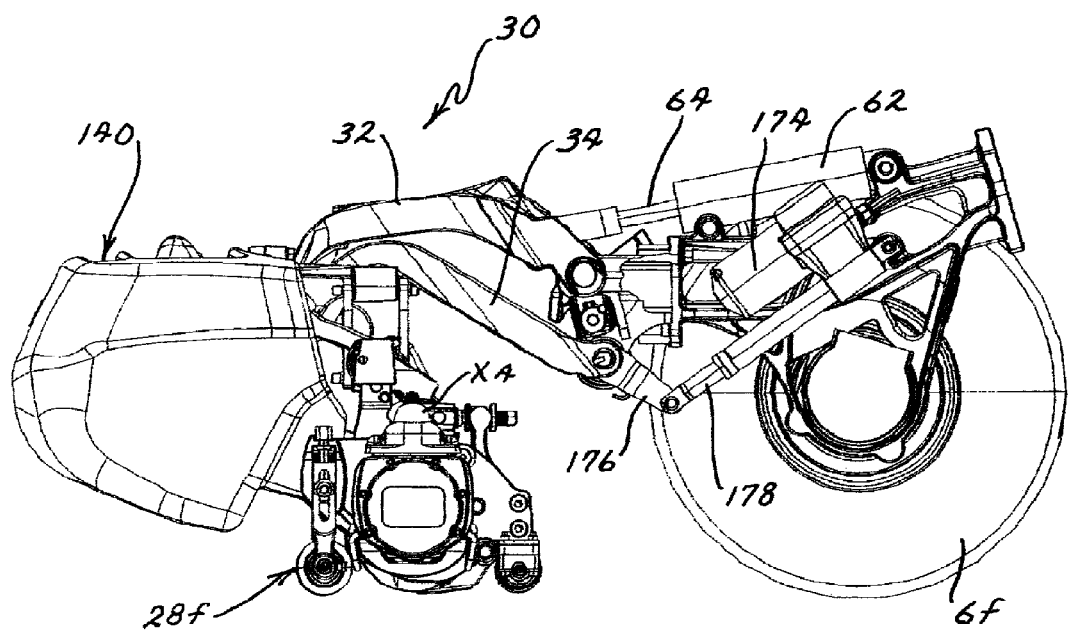
FIG. 4 is a side elevational view of the portion of the mower shown in FIG. 3.

FIGS. 1 and 2 illustrate one embodiment of a mower 2 according to this invention. Mower 2 comprises a frame 4 supported for rolling over the ground by a pair of front wheels 6f and a single rear wheel 6r arranged in a triangular configuration. The rear of mower frame 4 includes an engine compartment 10 that is normally covered and enclosed by an engine shroud or hood 8. An internal combustion engine or other suitable power source, such as a battery pack, hybrid electric drive system, fuel cell, etc., is mounted in engine compartment 10. Various other components can be housed on or adjacent the engine within engine compartment 10, such as drive train components, controls, etc.

A hydraulic system (not shown) is carried on mower frame 4 and is powered by the engine for providing pressurized hydraulic fluid flow for powering various components of mower 2. For example, the hydraulic system includes an engine driven hydraulic pump that powers one or more hydraulic motors that drive one or more of wheels 6 to cause mower 2 to be self propelled. Typically, front wheels 6f are driven by the hydraulic system while rear wheel 6r may or not be driven depending upon whether mower 2 is in a two wheel drive (2WD) or three wheel drive (3WD) configuration. The single rear wheel 6r could be replaced by a pair of rear wheels 6r and mower 2 could have a four wheel drive (4WD) configuration if both rear wheels 6r are also driven. The numbers of wheels 6 carried on mower frame 4, their placement relative to one another on mower frame 4, and whether all or only some of wheels 6 are driven can obviously vary.

An operator's station is carried on mower frame 4. The operator's station includes a seat 12 for carrying a seated operator. A control console 14 carrying various operational controls is mounted adjacent one side of seat 12. Control console 14 and seat 12 are together carried on an operator's station subframe 16.

The front of mower frame 4 in advance of seat 12 has a U-shaped frame member 18 that opens towards the front to create an open space 20 in front of seat 12. During normal operation of mower 2, open space 20 is closed to access from the front by an upwardly inclined footrest 22 that extends in front of seat 12. If one were to try and walk into space 20 from the front, one would hit footrest 22 and be prevented from reaching open space 20. The operator can rest his or her feet on footrest 22 while the operator is operating mower 2. If desired, various accelerator and foot pedal controls (not shown) can be located on a portion of footrest 22 for use by the operator in controlling the traction speed of mower 2.

A steering system comprises an L-shaped steering column 24 that mounts a steering wheel 26. Steering column 24 is cantilevered from one side of mower frame 4 such that the long leg of the L-shape extends vertically along one side of mower frame 4 and the short leg of the L-shape is horizontal and extends inwardly in front of operator's seat 12. Steering wheel 26 is located on the short, horizontal leg of steering column 24 immediately in advance of operator's seat 12 to allow an operator who is seated on seat 12 to steer mower 2. Rotation of steering wheel 26 by the operator pivots the single rear wheel 6r about a vertical axis for steering mower 2. Alternatively, steering wheel 26 can be used to pivot or steer other of the wheels 6. However, in the three wheel configuration depicted in FIGS. 1 and 2, it is preferred that the single rear wheel 6r be the steerable wheel.

Various reel cutting units 28 are carried on mower frame 4 in a triplex gang configuration. Cutting units 28 comprise a pair of front cutting units 28f carried in advance of front wheels 6f with front cutting units 28f being separated transversely from one another by a gap. A center rear cutting unit 28r is carried behind front cutting units 28f and is located to cover the gap between front cutting units 28f so that mower 2 cuts a single unbroken swath of grass in each pass of mower 2. Center rear cutting unit 28r is located on mower frame 4 generally between front wheels 6f of mower frame 4 and in advance of rear wheel 6r.

Other gang configurations of cutting units 28 could be used. In addition, additional rear cutting units 28r could be added to mower frame 4 on either side of center rear cutting unit 28r to expand the triplex configuration to a fiveplex configuration, and additional front cutting units 28f could be added outboard of each of front cutting units 28f to expand a fiveplex to a sevenplex.

Access to the Engine Compartment and to the Center Rear Cutting Unit

Referring now to FIG. 2, engine hood 8 can be pivoted upwardly and rearwardly on mower frame 4 about a transverse pivot axis to substantially expose engine compartment 10 and more particularly to expose the rear of engine compartment 10. With engine hood 8 pivoted to its open position as shown in FIG. 2, any components within engine compartment 10 that would have been covered by hood 8 are exposed. These components can be reached and easily serviced by someone who simply stands to one side of the rear of mower frame 4. Thus, simply pivoting hood 8 upwardly and rearwardly leads to easier service or maintenance for much of engine compartment 10.

However, the front of engine compartment 10 is covered, not by engine hood 8, but by operator's seat 10 and control console 14. Thus, subframe 16 is pivotally carried on mower frame 4 for rotation about a longitudinal pivot axis such that subframe 16, and thus operator's seat 12 and control console 14, can be pivoted 90° to one side of mower frame 4 as also shown in FIG. 2. The steering system is not, however, carried on subframe 16 and so does not pivot with subframe 16. Thus, when operator's seat 12 and control console 14 are pivoted to the side as shown in FIG. 2, steering column 24 and steering wheel 26 remain in their usual location on mower frame 4.

The purpose of pivoting subframe 16 to the side of mower frame 4 as shown in FIG. 2 is to expose or open up the front of engine compartment 10 for service or maintenance. Obviously, engine hood 8 can be pivoted upwardly and rearwardly, or subframe 16 can be pivoted to the side independently and separately from one another, depending upon whether one wishes to expose the rear of engine compartment 10 or the front of engine compartment 10. For example, if the components that need servicing are located in the rear of engine compartment 10 and are only covered by hood 8, then only hood 8 need be pivoted and subframe 16 can stay in its normal, non-pivoted orientation. However, the entire engine compartment from front to rear can be exposed if so desired by pivoting both subframe 16 and engine hood 8.

Footrest 22 located in front of operators' seat 12 is preferably provided in two portions. The first portion comprises a fixed footrest 22f that is fixed to mower frame 4 on the right of mower frame 4. The second portion is a pivotal footrest 22p that pivots at the left side of mower frame 4 about a longitudinal pivot axis. Fixed footrest 22f mounts whatever foot pedal controls are used on mower 2. Fixed footrest 22f is very narrow compared to pivotal footrest 22p. For example, fixed footrest 22f extends laterally only 10 to 20% or so of the entire width of footrest 22 while pivotal footrest 22p fills in the remaining 80% to 90% or so the width of footrest 22.

As shown in FIG. 1, pivotal footrest 22p has a usual, operational position in which it is rotated down and is flush with fixed footrest 22f as shown in FIG. 1. In this position, pivotal footrest 22p blocks access to open space 20 formed by U-shaped frame member 18. Alternatively, as shown in FIG. 2, pivotal footrest 22p can be rotated 90° to the side to an access or service position in which pivotal footrest 22p extends vertically and does not block open space 20.

When pivotal footrest 22p is rotated into its access or service position as shown in FIG. 2, the path is clear for an operator or a mechanic to walk back into open space 20 defined by frame member 18 through the opening or gap that exists between front cutting units 28f as indicated by the arrow A in FIG. 2. Center rear cutting unit 28r is located on mower frame 4 at least partially within open space 20 though the back of center rear cutting unit 28r might be tucked in back behind the cross bar of frame member 18. Thus, merely by pivoting pivotal footrest 22p to the side as shown in FIG. 2, one can easily reach center rear cutting unit 28r to service, adjust or even remove center rear cutting unit 28r. This task is further eased since each cutting unit 28 disclosed herein, including center rear cutting unit 28r, can be raised up off the ground into a service position where the cutting unit is tilted up by an angle of approximately 50° to 70° or so, as shown by the tipped up orientation of cutting units 28 in FIG. 1. When center rear cutting unit 28r is disposed in this tipped up service position, even the undersides of the cutting unit are exposed to one who has reached open space 20 by flipping up pivotal footrest 22p and by walking back through the gap between front cutting units 28f.

In many prior art mowers, center rear cutting unit 28r is located entirely or almost entirely under mower frame 4. While center rear cutting unit 28r can typically be lifted and lowered off the ground, it is difficult to service, adjust or maintain such a cutting unit because of the interference with the overlying mower frame 4. However, because of the placement in mower 2 of center rear cutting unit 28r at least partially within an open space 20 at the front of mower frame 4, and because the operator can selectively access space 20 simply by flipping up a pivotal footrest 22p, the difficulty of servicing, adjusting or maintaining center rear cutting unit 28r has been substantially decreased. This is an advantage to anyone who might work on such mowers.

In other prior art mowers, attempts have been made to increase the ease of servicing a center rear cutting unit by carrying the cutting unit on a pivotal arm to allow the center rear cutting unit to be selectively swung out from under the mower frame to a service position in which the center rear cutting unit is beside the mower frame and thus is exposed. While effective, this solution involves the use of additional structure, such as the pivotal arm and various latches and the like for latching the arm and the center rear cutting unit in its usual operational position. It also complicates the task of lifting and lowering the center rear cutting unit off the ground.

These disadvantages are avoided in the approach disclosed herein. All that is required is to appropriately locate center rear cutting unit 28r at least partially within open space 20 at the front of mower 2 and to allow an operator to access this space. Access is easily and inexpensively provided simply by pivoting a portion of footrest 22, a part that would normally be present on mower 2. Thus, no additional parts are required except for the pivot pin(s) that mount pivotal footrest 22p to mower frame 4.

In addition, the increased access provided by pivotal footrest 22p to open space 20 at the front of mower frame 4 is useful in allowing access to the front of engine compartment 10 from the front of mower 2 rather than simply from the side. Thus, with pivotal footrest 22p pivoted to the side as shown in FIG. 2, and with subframe 16 also pivoted to the side as shown in FIG. 2, a person standing in open space 20 can easily reach into and service the front of engine compartment 10 from the front. This allows such a person to more easily service any components that are located at the right front of engine compartment 10. Such components would otherwise be the furthest away from someone standing adjacent the left side of mower frame 4 which is where someone would otherwise have to stand to service the front of engine compartment 10 when subframe 16 is pivoted to the right side of mower 2.

Various modifications of the fixed and pivotal footrests are possible. For example, it is preferred that fixed footrest 22f carry the foot pedal controls for mower 2 since any linkages extending to such foot pedal controls will remain in place and be undisturbed by pivoting the separate pivotal footrest 22p. However, if so desired, footrest 22 could be split into two pivotal portions 22p of more equal size with one portion pivoting to the right side of mower frame 4 and the other portion pivoting to the left side of mower frame 4, i.e. opening and closing like barn doors. The portion pivoting to the right side of mower 2 could further be integrated with subframe 16 to pivot to the right with the subframe 16.

The Cutting Unit Suspension

Each cutting unit 28 is coupled to mower frame 4 by a suspension 30 that lifts and lowers cutting unit 28 out of and into contact with the ground, respectively. Suspension 30 also provides cutting unit 28 with three degrees of freedom along orthogonal x, y and z axes to allow each cutting unit to individually follow the contours of the ground. Because suspension 30 is identical from one cutting unit to another, the description of suspension 30 in conjunction with one cutting unit 28 will suffice to describe suspensions 30 for all cutting units 28. As depicted in FIGS. 3-8, suspension 30 is shown in the position in which cutting unit 28 has been lowered into its operative cutting position with cutting unit 28 in rolling contact with the ground.

Suspension 30 includes an upper suspension arm 32 and an underlying lower suspension arm 34. In the top plan view, each arm 32, 34 is shaped like an A with a wider rear end and a narrower front end. Each arm 32, 34 has a truss like beam structure and is preferably cast or formed as an integral one piece part. In other words, upper arm 32 is a first one piece part and lower arm 34 is a second one piece part that is separate from upper arm 32.

Each arm 32, 34 has generally the same A shape in the top plan view and may be referred to as an "A arm" because of this A top plan shape. However, arms 32, 34 have different side elevational shapes with lower arm 34 having a fairly pronounced, downwardly facing, U-shaped gooseneck 36 near the front end thereof. This allows the front of lower arm 34 to nest closer to the underside of the front of upper arm 32 than at the rear. In other words, the fronts of arms 32, 34 are vertically closer together than the rears of the arms 32, 34. See FIG. 5.

Each side of each arm 32, 34 at the rear thereof includes a circular bore 38 that extends generally in a vertical plane. The front of each arm 32, 34 has a similar bore 38 that extends generally in a horizontal plane when cutting unit 28 is disposed in its operative cutting position. Pivot bushings 40 having a spherical seat (not shown) in the interior thereof are disposed in each of these bores 38. Thus, bushing 40 at the front of each arm 32, 34 will be generally horizontal when cutting unit 28 is in its operative cutting position and bushings 40 at either side of the rear of each arm 32, 34 will be generally vertical. These orientations of bushings 40 have been found to be most effective in absorbing the typical impact shocks experienced by cutting unit 28 during cutting of the grass.

Bushings 40 at the rear of each arm 32, 34 are pivotally journalled on a pair of transversely outwardly extending rear ball joints 42r. The bushings 40 and ball joints 42 on which they are received, whether used at the front or rear of each arm 32, 34, have the structure disclosed in U.S. Pat. No. 7,144,182, which patent is hereby incorporated by reference. Rear ball joints 42r for each arm 32, 34 are aligned with one another to form a common, transversely extending, substantially horizontal pivot axis. In this respect, the spherical head of each ball joint 42r is received within the interior spherical elastomeric or polymeric seat of bushing 40. Thus, upper arm 32 pivots on mower frame 4 about a first horizontal pivot axis denoted as x1. Similarly, lower arm 34 pivots on mower frame 4 about a second horizontal pivot axis denoted as x2. See FIG. 5. Note that rear ball joints 42r for only upper arm 32 have been shown in FIGS. 3-7 with rear ball joints 42r for lower arm 34 having been omitted from the figures for the purpose of clarity.

Figure 6:
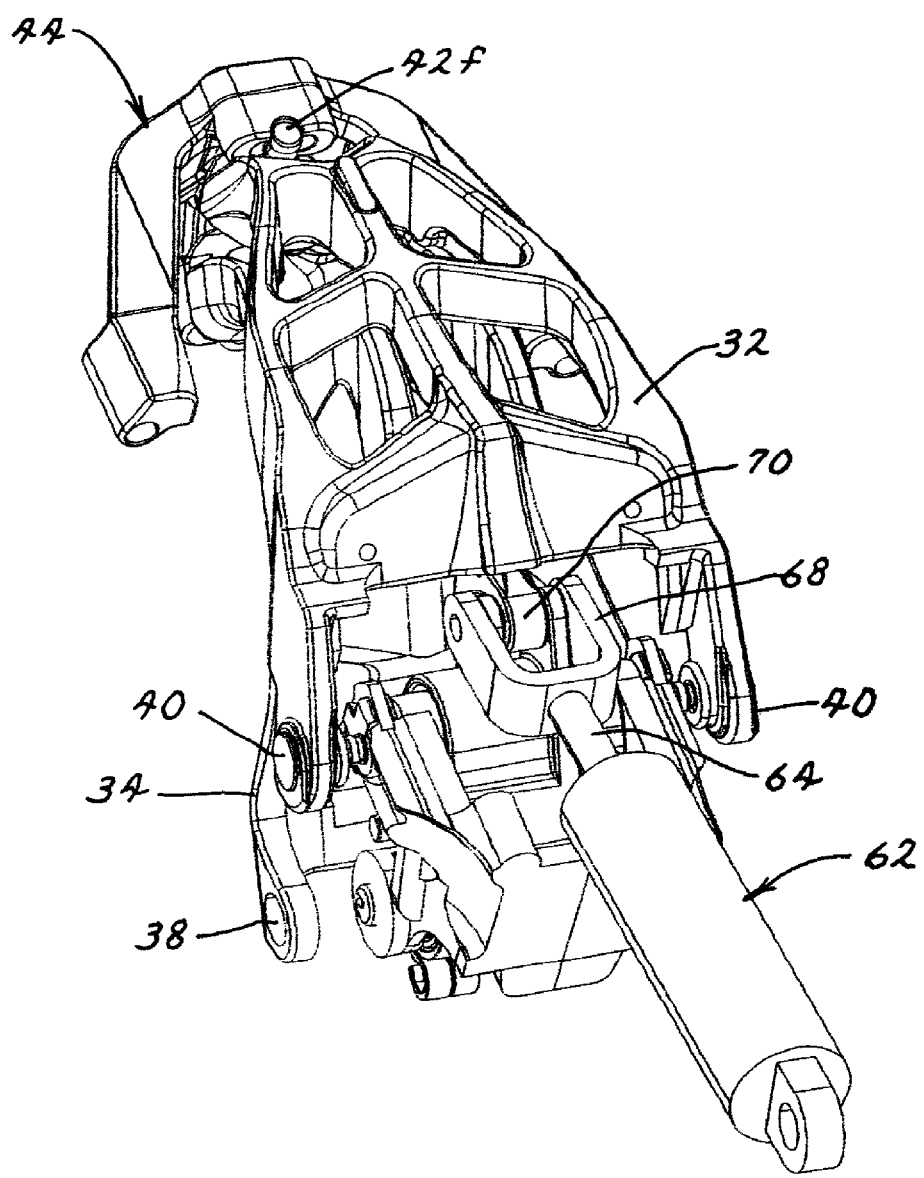
FIG. 6 is a rear perspective view of what is shown in FIG. 5.
Figure 7:
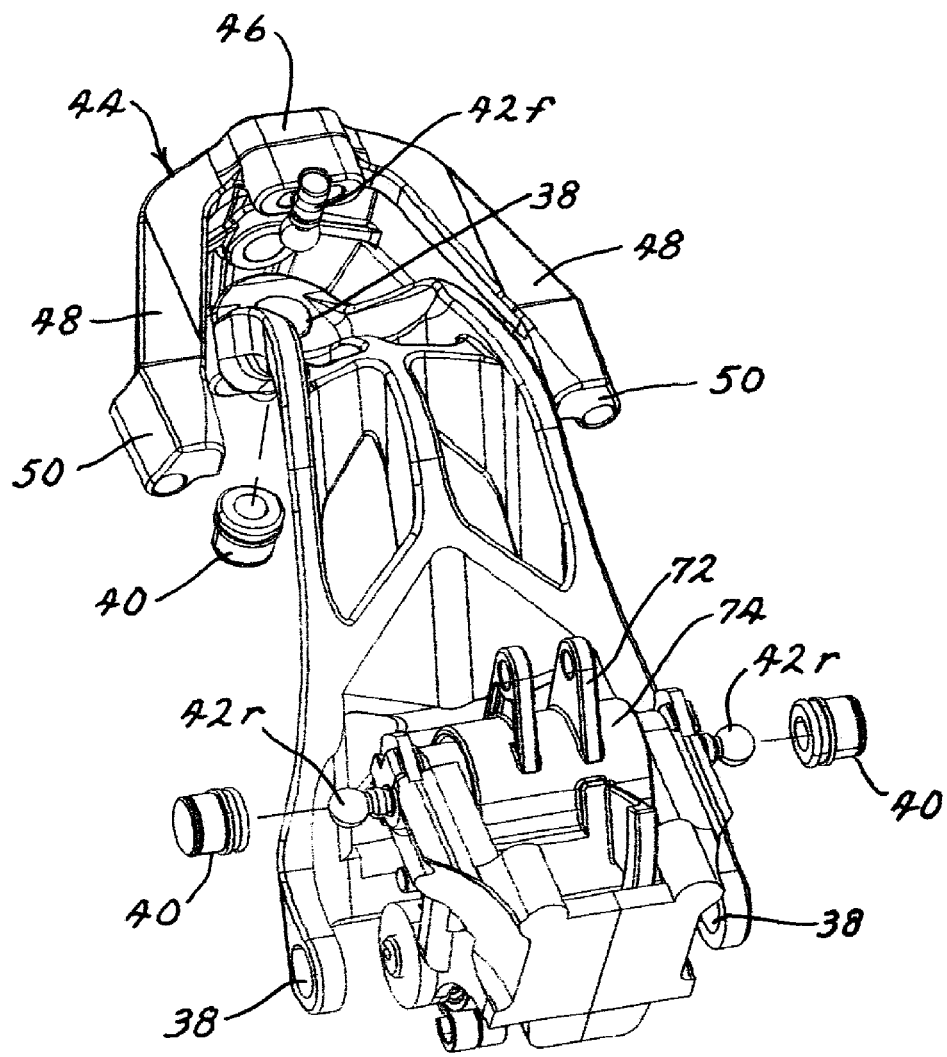
FIG. 7 is a rear perspective view similar to FIG. 6, but with the lift and lower actuator having been removed, the upper arm having been removed, and with the three pivot bushings of the upper arm having been exploded off the ball joints on which such bushings are normally received, all for the purpose of clarity.

Bushing 40 at the front of each arm 32, 34 is pivotally journalled on a vertically extending front ball joint 42f in the same manner as for bushings 40 and rear ball joints 42r. Instead of being fixed to mower frame 4, however, front ball joints 42f for the arms are clamped in place to a steering head 44. Referring to FIGS. 6 and 7, steering head 44 includes a somewhat planar vertically extending body 46. Body 46 has a pair of rearwardly extending, transversely spaced posts 48 that terminate in longitudinal pods or hubs 50 at the rear thereof.

Figure 8:
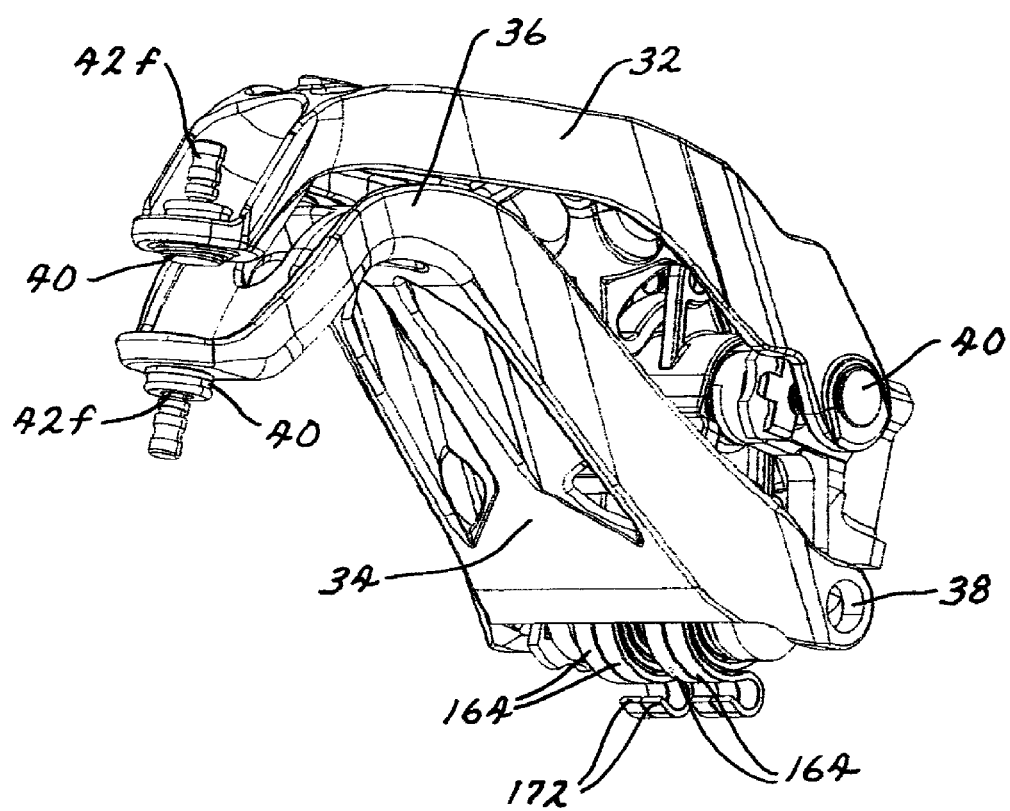
FIG. 8 is a front perspective view of what is shown in FIG. 5, but with the lift and lower actuator and the steering head having been removed, all for the purpose of clarity.

Front ball joints 42f are secured to the backside of body 46 of steering head 44 with the ball portion of the ball joint 42f for upper arm 32 extending downwardly from body 46 as shown in FIG. 7. The clamp that fixes this ball joint 42f to the backside of body 46 has been removed in FIG. 7 for the purpose of clarity. Front ball joint 42f for lower arm 34 is similarly mounted to the backside of body 46, but is inverted such the ball portion of that ball joint extends upwardly into bushing 40 at the front of lower arm 34. FIG. 8. depicts the inverted relationship of the two front ball joints 42f relative to one another. The upper and lower arms 32, 34 are connected together for joint rotation about their respective pivot axes x1 and x2 since the fronts of the arms are each connected to a single common piece, namely to steering head 44 as shown in FIG. 5.

Figure 5:
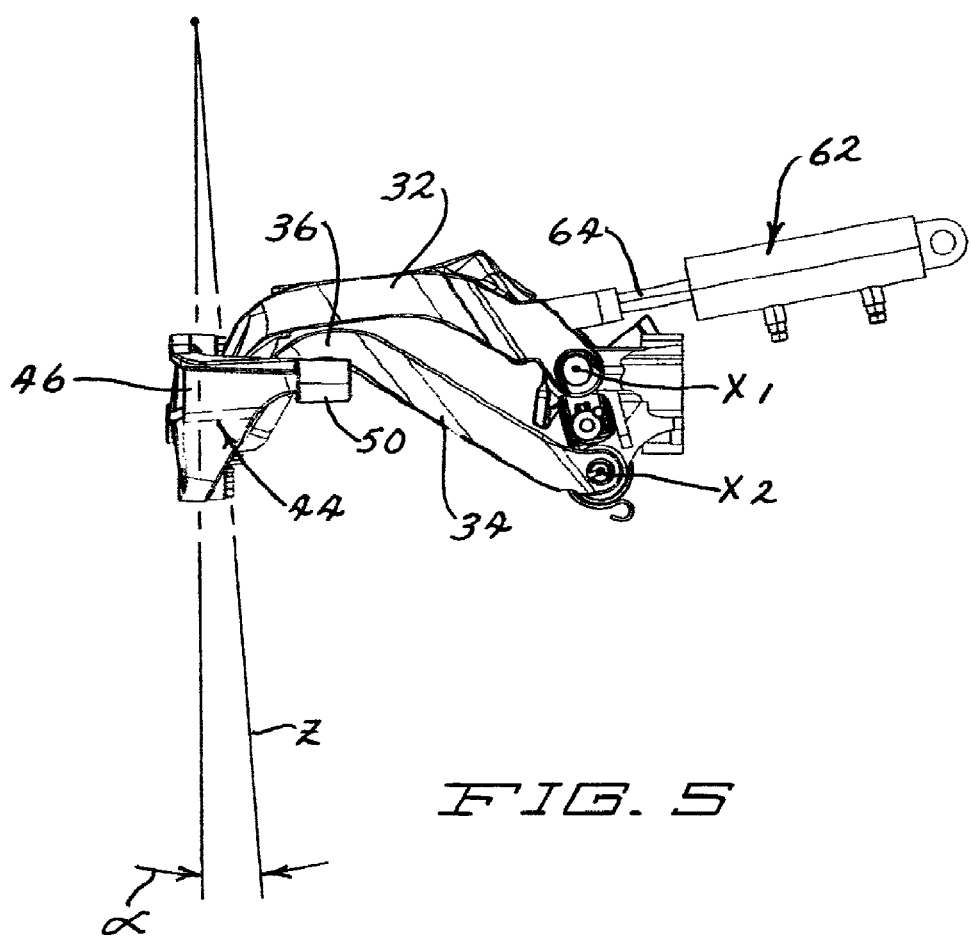
FIG. 5 is a side elevational view of a portion of what is shown in FIG. 3, particularly illustrating the double A arms and steering head portions of the suspension that suspends the cutting unit from the frame of the mower as well as the illustrating the lift and lower actuator for lifting and lowering the cutting unit relative to the ground with the steering head permitting yaw of the cutting unit about a yaw axis relative to the double A arms.

As further shown in FIG. 5, when cutting unit 28 is in the operative cutting position, front ball joints 42f and their stems are aligned on a yaw pivot axis to allow cutting unit 28, which is carried beneath steering head 44, to steer or yaw about a yaw pivot axis denoted as z. This allows cutting unit 28 to better turn or track over the ground during turns of mower 2 without skidding or dragging cutting unit 28 over the turf. The yaw pivot axis z forms one degree of freedom of motion for cutting unit 28. The yaw pivot axis z has a particular angle or inclination relative to vertical that will be described in more detail hereafter in the section hereof entitled Negative Caster Angle.

Figure 10:
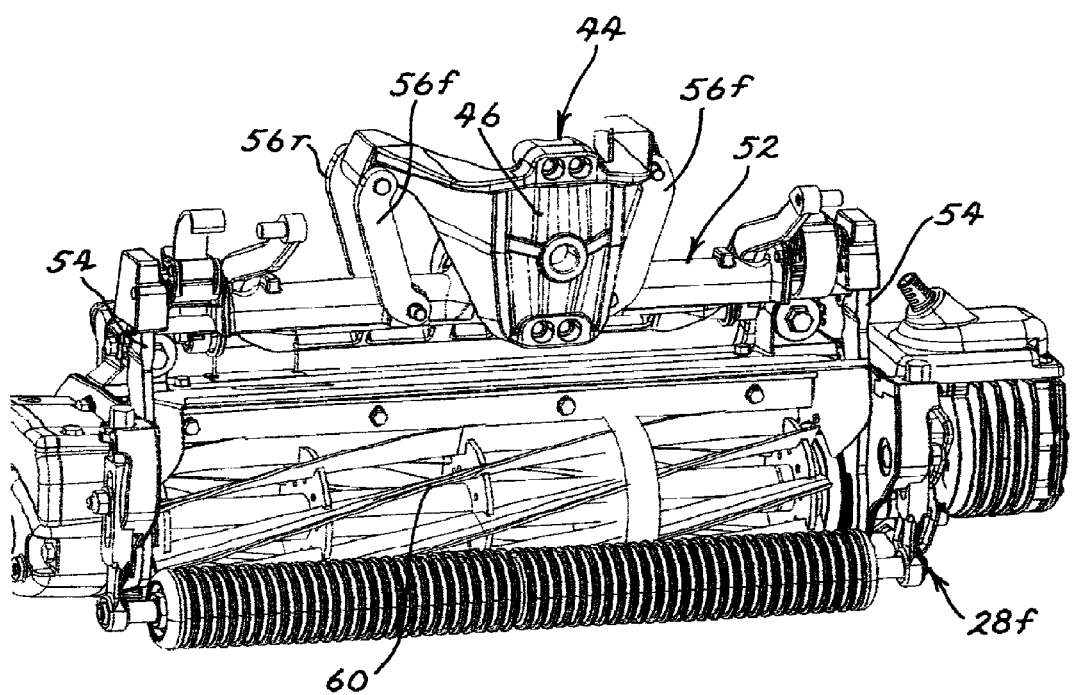
FIG. 10 is a front perspective view of the reel cutting unit shown in FIG. 3 connected to the steering head of the suspension by the remaining components of the suspension, namely by the transverse links for allowing roll of the cutting unit relative to the steering head about a roll axis and by the cutting unit carrier frame attached to the transverse links including the pitch arms of the carrier frame for allowing pitch of the cutting unit relative to the carrier frame about a pitch axis.
Figure 13:
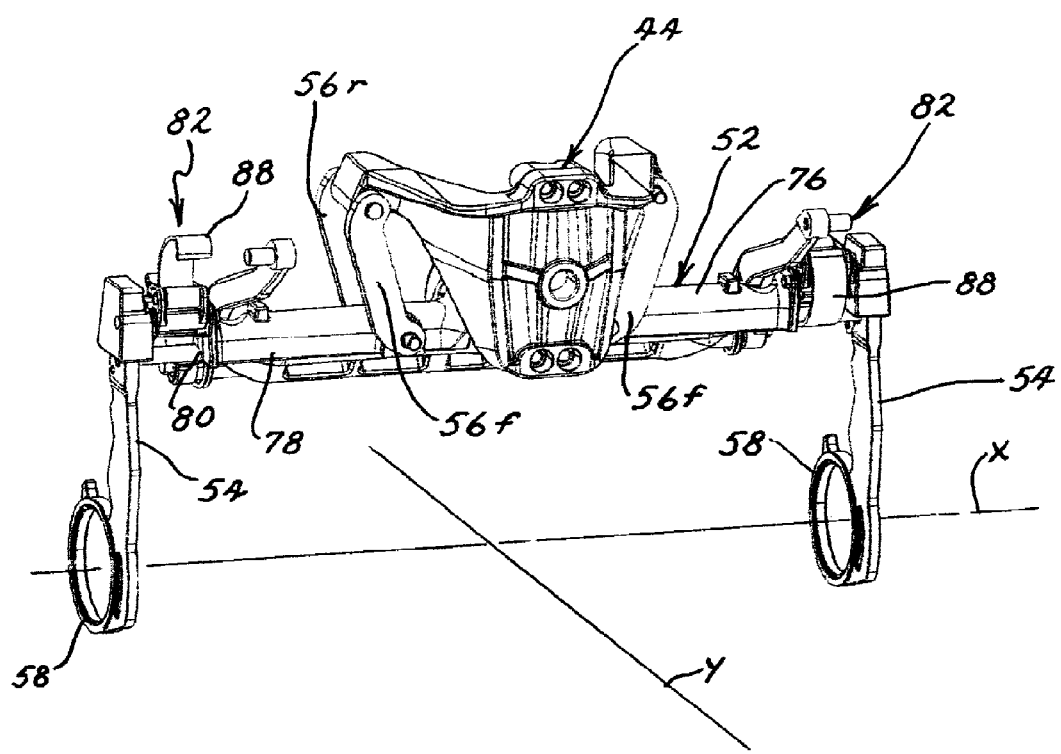
FIG. 13 is a front perspective view of what is shown in FIG. 10, but with the reel cutting unit having been removed for the sake of clarity, and particularly illustrating the clamps for removably holding the reel cutting unit to the cross member of the carrier frame with one clamp being shown open and one clamp being shown closed.

Referring now to FIGS. 10 and 13, suspension 30 further includes a generally U-shaped cutting unit carrier frame 52. Carrier frame 52 extends transversely across the width of cutting unit 28 and has a pair of downwardly extending vertical pitch arms 54 at either end thereof. Carrier frame 52 is, in reality, a number of different parts that are clamped together when cutting unit 28 is installed and is in its operative cutting position. In another aspect of this invention, these parts can be unclamped to easily remove cutting unit 28 from mower 2 as discussed hereafter in a section entitled Easily Removable Cutting Unit. However, for the purposes of describing suspension 30 of cutting unit 28, carrier frame 52 and pitch arms 54 are, in effect, rigidly fixed relative to one another to move together as a single unit when cutting unit 28 is installed on mower 2.

Referring now to FIG. 13, carrier frame 52 is pivotally attached to steering head 44 by a pair of front rigid links 56f and a pair of rear rigid links 56r. The upper ends of front links 56f are pivotally attached to the front ends of hubs 50 on posts 48 of steering head 44 and the upper ends of rear links 56r are pivotally attached to the rear ends of hubs 50 on posts 48 of steering head 44. Similarly, the lower ends of the front and rear links 56f, 56r are pivotally secured to the front and back of carrier frame 52. The links 56f, 56r in each pair are inclined relative to one another as taught in U.S. Pat. No. 7,191,584, owned by the assignee of this invention, which patent is hereby incorporated by reference. This allows cutting unit 28 to roll or pivot side to side about a horizontal longitudinal roll axis indicated as y in FIG. 13. This provides the second degree of freedom for cutting unit 28.

The third degree of freedom for cutting unit 28 is provided by the connection of the lower ends of pitch arms 54 to cutting unit 28 itself. As also shown in FIG. 13, the lower end of each pitch arm 54 has a pivot hub 58. Pivot hubs 58 are pivotally connected to cutting unit 28 about the axis of the rotatable cutting reel 60 of cutting unit 28. Pivot hubs 58 of pitch arms 54 together define a horizontal transverse pitch axis indicated as x in FIG. 13, which pitch axis is the same as the axis of rotation of cutting reel 60. Thus, cutting unit 28, which is not itself shown in FIG. 13, can pivot or pitch fore and aft about the pitch axis by rocking fore and aft between pitch arms 54.

A lift and lower actuator 62, such as a hydraulic cylinder, is pivotally connected between mower frame 4 and upper arm 32. Referring to FIG. 5, when the actuator arm 64 is retracted into the cylinder of actuator 62, upper arm 32 is pivoted about its pivot axis x1 (as is lower arm 34 about its pivot axis x2 since lower arm 34 is connected to upper arm 32 through steering head 44) in a clockwise direction shown by the arrow B in FIG. 11A. This raises steering head 44 to lift cutting unit 28 off the ground. Extension of actuator arm 64 from the cylinder has the opposite effect, namely a lowering of steering head 44 and cutting unit 28 relative to the ground.

Figure 11A:
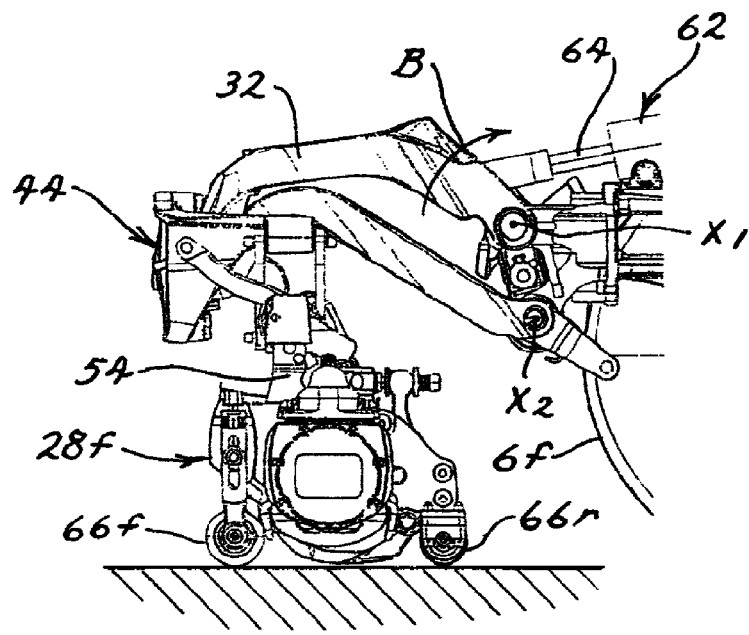
FIGS. 11A-11D are side elevational views of the reel cutting unit shown in FIG. 3, particularly illustrating the reel cutting unit being on the ground in the cutting position thereof in FIG. 11A, being lifted off the ground in FIG. 11B into an intermediate position between the cutting position and a raised transport position, being in the raised transport position in FIG. 11C, and being lifted further out of the raised transport position to a raised service position in FIG. 11D.
Figure 11B:
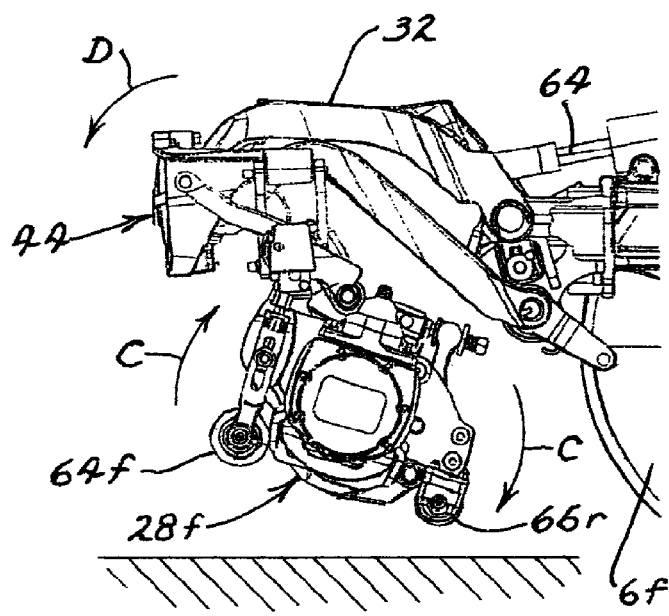
Figure 11C:
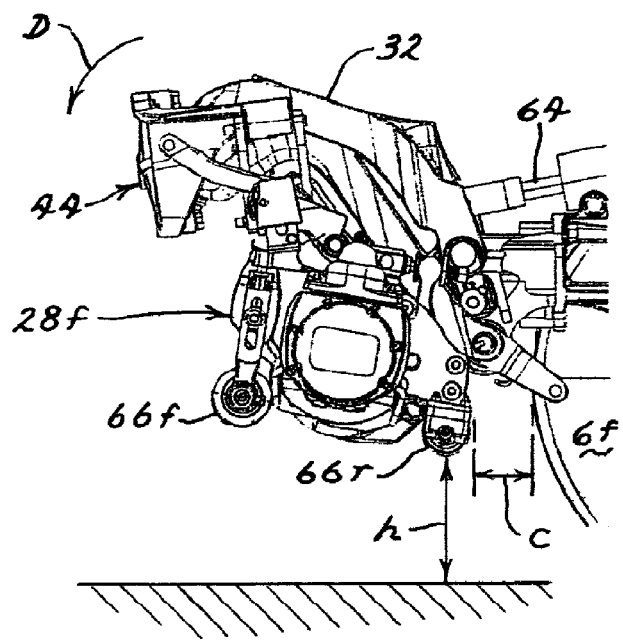

Referring now to FIGS. 11A-11C, suspension 30 lifts cutting unit 28 from its cutting position on the ground as shown in FIG. 11A into a raised transport position as shown in FIG. 11C. Cutting unit 28 is placed into the transport position when the operator wishes to drive mower 2 from one location to another at a transport speed that is higher than the cutting speed at which mower 2 is driven when cutting grass.

Suspension 30 allows cutting unit 28 to approach and depart the ground in a preferred tail down position as shown in FIG. 11B. Thus, when cutting unit 28 lands on the ground, it lands first on the rear roller 66r of cutting unit 28 and then pivots downwardly about rear roller 66r until front roller 66f touches the ground last. Similarly, when cutting unit 28 lifts off the ground, front roller 66f departs first, cutting unit 28 then pivots upwardly about rear roller 66r, and rear roller 66r leaves the ground last.

The tail down approach and departure of cutting unit 28 happens because the center of mass of cutting unit 28 is behind the pitch axis x of pitch arms 54. Thus, when cutting unit 28 first lifts off the ground, cutting unit 28 first pitches or rocks rearwardly relative to pitch arms 54 until pitch arms 54 engage against a stop (not shown) on some portion of mower frame 4 of cutting unit 28. At that point, the pitching action of cutting unit 28 stops with cutting unit 28 being maintained in the tail down position. In FIG. 11B, cutting unit 28 is shown having rocked back in the direction of the arrows C with the frame of cutting unit 28 having stopped out against pitch arms 54. However, this tail down orientation of cutting unit 28 relative to the ground is not itself new in the reel mower art. Prior Toro reel mowers have done the same thing.

However, in addition to maintaining the tail down orientation of cutting unit 28 relative to the ground in landing or departing the ground, suspension 30 also does something quite unique. In lifting further upwardly into the transport position, namely in going from the intermediate position shown in FIG. 11B to the transport position shown in FIG. 11C, cutting unit 28 actually begins to level out into a more horizontal orientation. This is due to a retrograde or opposite rotation of steering head 44 on the fronts of upper and lower arms 32, 34. As upper and lower arms 32, 34 rotate in the direction of the arrow B, steering head 44 is actually rotated oppositely in the direction of the arrow D in FIGS. 11B and 11C. After pitch arms 54 lock against the frame of cutting unit 28, this opposite rotation D then pivots cutting unit 28 from its tail down position back to a more level position while simultaneously moving cutting unit 28 back closer to the front wheel.

While FIG. 11C shows cutting unit 28 not completely level, suspension 30 could be designed to bring cutting unit 28 even more level if steering head 44 is rotated further forwardly in the direction of the arrow C. In addition, another approach would be to use some type of biasing force from springs (not shown) that would help accomplish this. For example, springs (not shown) could be used between steering head 44 and lower arm 34 to help center steering head 44 to face directly forwardly after cutting unit 28 reaches the transport position if steering head 44 and cutting unit 28 are initially skewed or canted about the yaw axis z at the beginning of the lifting operation. Such centering springs (not shown) would be arranged to push against steering head 44 on either side of a longitudinal centerline through steering head 44. This pushing action would also bias steering head 44 further forwardly in the direction of the arrow D, with steering head 44 pivoting further forwardly due to the flex in bushings 40, to level out cutting unit 28 even more than is shown in FIG. 11C.

Regardless of how level cutting unit 28 gets in the transport position thereof as shown in FIG. 11C, there is no doubt that it becomes more level and that it moves rearwardly with the rear roller 66r of cutting unit 28 getting closer to the adjacent wheel 6f. This allows the vertical height of rear roller 66r above the ground, indicated as h in FIG. 11C, to increase by a couple of inches over what would have occurred had the tail down orientation been maintained in the transport position, e.g. the height h above the ground increases from 2 inches or so to 4 inches or so. This extra clearance helps cutting unit 28 avoid hitting ground obstacles and the like as mower 2 drives over the ground with cutting unit 28 in the transport position while allowing cutting unit 28 to be conveniently lifted by pivoting about a horizontal, transverse pivot axis x1. Prior art mowers often pivoted or folded the cutting units about horizontal, longitudinal axes in order to provide sufficient ground clearance in transport, but this creates its own set of problems including exposing the undersides of the cutting units while in transport.

In addition, as the cutting unit 28 moves into its transport position, the cutting unit is moved or tucked in rearwardly towards the wheel 6 with the fore-and-aft clearance between the two, indicated as c in FIG. 11C, decreasing. When this happens with each of the two front cutting units 28f in relation to the front wheels 6f, the stability of mower 2 in transport is improved. It decreases the moment arm between the center of mass of cutting unit 28f and the rotational axis of the adjacent front wheel 6f, thereby decreasing the tipping force exerted on mower 2 by front cutting units 28f when all of the cutting units 28 are in their transport position. This enhances stability of mower 2 when going up or down hills and the like. It decreases or potentially even eliminates the need for counterweights carried on mower frame 4.

Figure 11D:
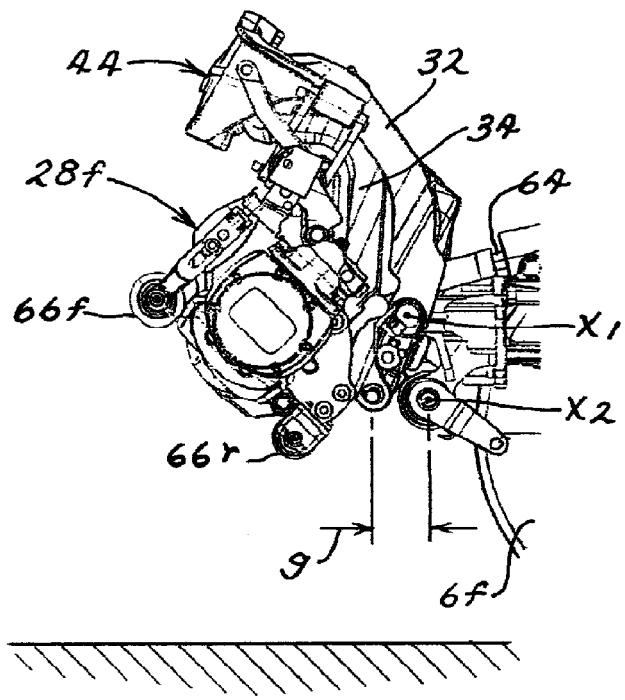

In moving between the various positions shown in FIGS. 11A-11C, the pivot axes x1 and x2 of upper and lower arms 32, 34 remain fixed to mower frame 4 and remain fixed relative to each other. However, it is desirable, though not necessary, to provide cutting unit 28 with an even more elevated service position in which cutting unit 28 is tilted up at a relatively steep angle to expose the underside of cutting unit 28 for service or maintenance. Such a service position is illustrated in FIG. 11D. As shown in FIG. 11D, the operator or a mechanic has greater access to and ability to reach front and rear rollers 66, the rotatable cutting reel 60, and the bedknife of cutting unit 28. For example, with cutting unit 28 in the service position shown in FIG. 11D, it is fairly easy to remove the bedknife for sharpening or adjustment or to remove and replace front and rear rollers 66.

In going between the transport and service positions shown in FIGS. 11C and 11D, respectively, actuator arm 64 of lift and lower actuator 62 is retracted even further into the cylinder while lower arm 34 is released from its fixed attachment to mower frame 4. In other words, the two rear ball joints 42r (not shown) that pivot lower arm 34 on mower frame 4 are normally fixed to mower frame 4 by a latch (not shown) that engages a yoke (not shown) that carries rear ball joints 42r for lower arm 34. This locked or latched condition for lower arm 34 is the condition that occurs when cutting unit 28 is in its operative cutting position or its transport position or in any intermediate position between the cutting and transport positions. The latch is disengaged from the yoke when actuator arm 64 is retracted further into the cylinder to begin putting cutting unit 28 into the service position.

The disengagement of the latch can occur in many ways. As shown in FIG. 6, actuator arm 64 of the cylinder has a front clevis 68 that is pinned by a pin (not shown) to a flange 70 on upper arm 32. This pin also passes through a pair of apertured tabs 72 on a rotatable latch release 74 carried on mower frame 4 beneath upper arm 32. See FIG. 7. When actuator arm 64 is moved from its transport to its service position, actuator arm 64 acting through the pin and tabs 72 finally rotates latch release 74 far enough to release the latch that locks or fixes the yoke holding the two rear ball joints for lower arm 34 to mower frame 4. When this occurs, the rear of lower arm 34 and the two rear ball joints therefor can now move off the pivot axis x2 about which they normally rotate and will move forwardly and pivot in an arc about the pivot axis x1 of upper arm 32. This forward movement of the rear of lower arm 34 is depicted by the gap g that forms between the rear of lower arm 34 and the pivot axis x2 as shown in FIG. 11D. Rear ball joints 42r for upper arm 32 that define the pivot axis x1 are always fixed in place on mower frame 4.

In any event, releasing lower arm 34 for movement relative to mower frame 4 when actuator arm 64 is retracted over its final range of travel allows lower arm 34 to move forwardly and pivot upwardly as needed about the pivot axis x1 to permit cutting unit 28 to rise and dramatically tilt or incline into the service position thereof. When actuator arm 64 is extended to move cutting unit 28 from its service position back down to its transport position, the latch can be spring biased to automatically reset itself and relatch the yoke that holds rear ball joints 42r for lower arm 34 to mower frame 4 with rear ball joints 42r again aligned on axis x2 when the transport position is reached. Thus, cutting unit 28 is lifted by a single lift and lower actuator from its usual cutting position in contact with the ground, through a raised transport position, and on into a raised and inclined service position, and vise versa, simply by extending or retracting actuator arm 64 of actuator 62 through different ranges of travel.

While a service position is desirable, it is not necessary and could be deleted in the design of suspension 30. If the service position were deleted, then the structure that permits the service position to be reached, such as the latch that is released to release the rear ball joints 42r for lower arm 34, could be deleted and the rear ball joints 42r for lower arm 34 would be fixed to some portion of mower frame 4. Alternatively, one could avoid using the service position simply by restricting the stroke of actuator arm 64 to the range of travel needed to go between the cutting and transport positions only. Thus, the service position can be considered to be an optional feature.

Various pushbutton or other controls can be employed on control console 14 to allow the operator to power actuator 62 through any desired range or ranges of travel. For example, one button could be provided for going from cutting to transport and another button could be provided for going from transport to service. In addition, unlatching the latch that fixes or holds the rear of lower arm 34 to mower frame 4, and relocking the latch, is done automatically as actuator arm 64 extends and retracts. The operator is not required to manually remove or reinstall a manual latch.

Suspension 30 for cutting unit 28 comprises a pair of durable A arms that are pivotally coupled to mower frame 4 and to steering head 44 that carries cutting unit 28 by a plurality of durable bushings 40 and ball joints 42. Such bushings and ball joints permit any twisting that is needed as suspension 30 is lifted and lowered between its various positions. In addition, the arms 32, 34 and the rest of suspension 30 are configured to allow a tail down landing or take off orientation of cutting unit 28 relative to the ground while also providing a more level and more rearward orientation of cutting unit 28 relative to the adjacent wheel 6 of mower 2 in the transport position, all while lifting and lowering cutting unit 28 by pivoting cutting unit 28 about a transverse pivot axis on mower frame 4. Finally, cutting unit 28 can be simply and easily placed into a more inclined and more elevated service position without requiring any action on the part of the operator other than to continue to retract actuator arm 64.

Negative Caster Angle

As explained earlier, the yaw axis z provided by front ball joints 42f of upper and lower arms 32, 34 when cutting unit 28 is in its operative, lowered cutting position is not strictly vertical. Instead, the yaw axis is inclined or canted relative to the vertical at a caster angle denoted as a in FIG. 5. This caster angle is a negative angle within the range of about 5° to 10°, and preferably about 6° or so, meaning that the angle of inclination points rearwardly relative to cutting unit 28 and relative to a vertical reference line as one proceeds downwardly along the angle of inclination. Known prior art reel cutting units have caster angles that are either precisely vertical (a zero caster angle) or are at a forward angle (a positive caster angle), namely an angle that points forwardly as one proceeds downwardly.

The Applicants have found that using a negative caster angle prevents the side of cutting unit 28 on the inside of a turn from dipping or wanting to dip down towards the ground (due to the overturning moment on the cutting unit from the suspension) during a turn of mower 2 and during a corresponding turn of cutting unit 28. For example, when mower 2 is a riding greensmower as depicted herein, mower 2 is often used in a clean up pass around the margins of the green after the middle of the green has been mowed in a plurality of back and forth straight passes on the green. In such a clean up pass, mower 2 is turned or guided all the way around the periphery of the green to mow the grass at the periphery. In prior art greensmowers with positive or zero caster angles on cutting units 28, the suspension tended to force the side of cutting unit 28 on the inside of the turn down towards the ground, causing the cut grass swath to have a slight, uneven washboard effect or pattern. Given the low heights of cut at which greensmowers cut grass, and given the desire for perfection of the mowed surface on the green of a golf course, this washboard effect or pattern is not desirable.

Now, with the negative caster angle disclosed herein, the force of the ground acting on the rollers of cutting unit 28 during a turn, causes the side of cutting unit 28 on the inside of the turn to remain level during turns. In effect, the negative caster angle disclosed herein tends to cause the side of cutting unit 28 on the inside of the turn to rise up an amount that counteracts the overturning moment from the suspension This avoids the washboard effect or pattern noted earlier and is, therefore, desirable.

Easily Removable Cutting Unit

Referring now to FIGS. 12-15, cutting unit carrier frame 52, as noted earlier, comprises a plurality of parts that can be clamped and unclamped from one another to ease the task of installing or removing cutting unit 28 from mower 2. With respect to this aspect of the invention, carrier frame 52 comprises a cross member 76, a cross rod 78, and the pitch arms 54 that are carried at either end of cross rod 78. Cross rod 78 and pitch arms 54 carried by cross rod 78 are obviously now separate parts from cross member 76 of carrier frame 52. In other words, pitch arms 54 are not integrally connected to cross member 76 as they are in the assignee's prior U.S. Pat. No. 7,191,584. Rather, pitch arms 54 are carried on a separate cross rod 78 and such pitch arms 54 will be fixed or connected to cross member 76 only when cross rod 78 is connected to cross member 76. This can be done in this invention in a quickly and easily attachable and detachable manner to allow cutting unit 28 to be easily removed from mower 2.

Figure 12:
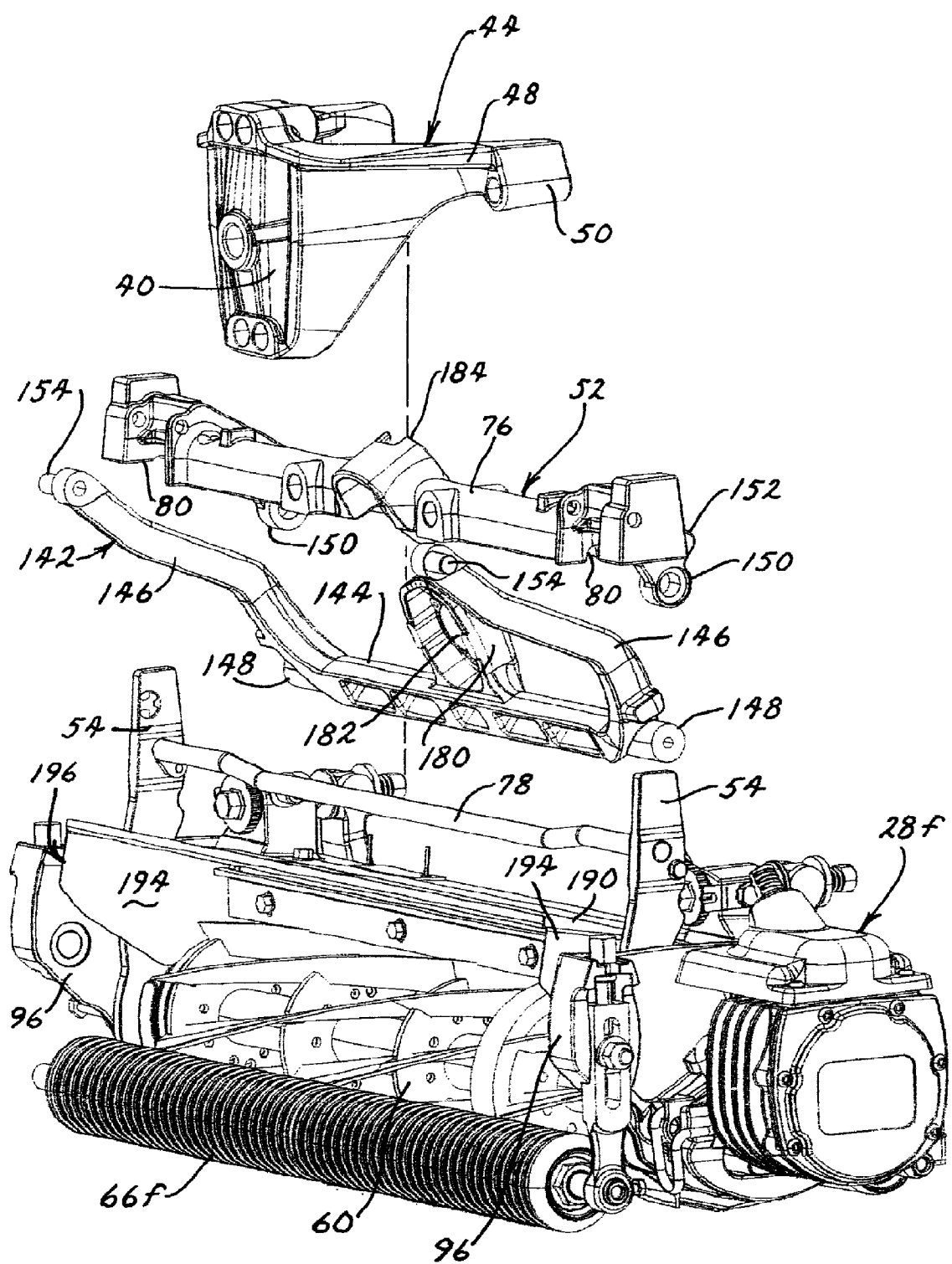
FIG. 12 is a front perspective view similar to FIG. 10, particularly illustrating the steering head, the cutting unit carrier frame, a grass basket support member, and the reel cutting unit exploded relative to one another.
Figure 14:
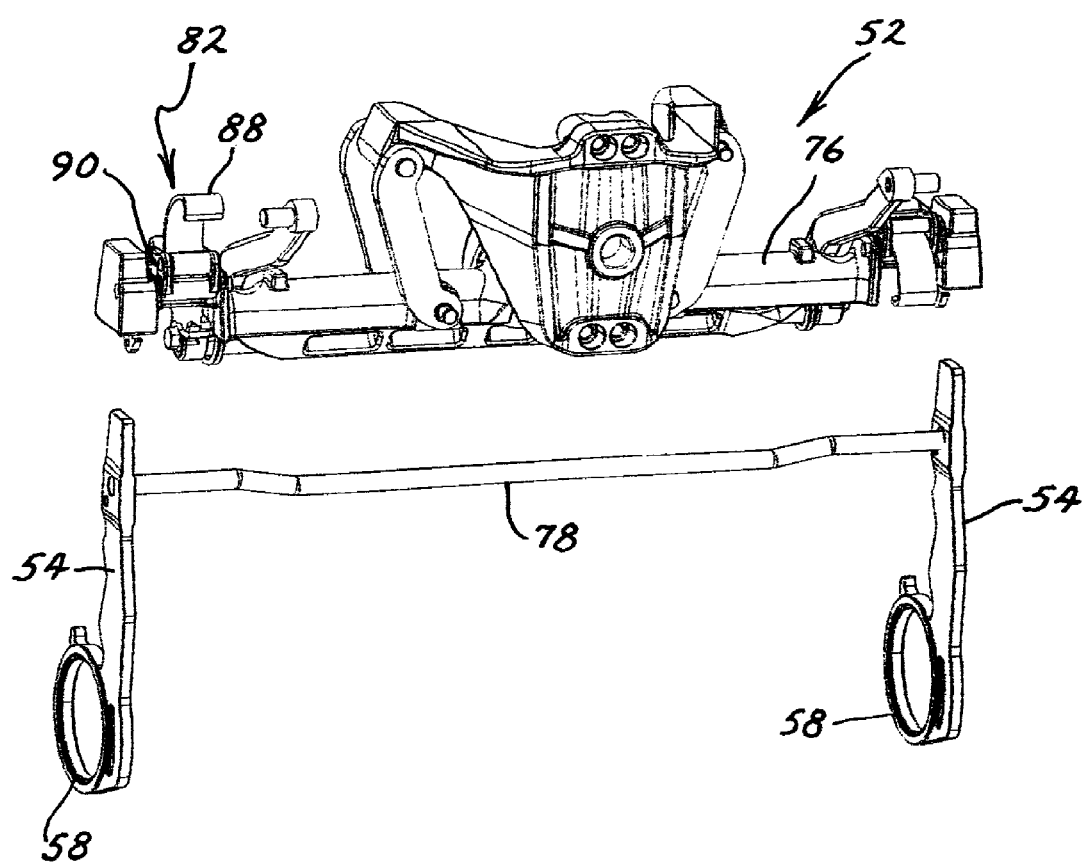
FIG. 14 is a front perspective view similar to FIG. 13, but particularly illustrating the pitch arms and cross rod of the carrier frame having been separated from the cross member of the carrier frame to illustrate how the reel cutting unit is removed as an entire unit from the mower of FIG. 1.
Figure 15:
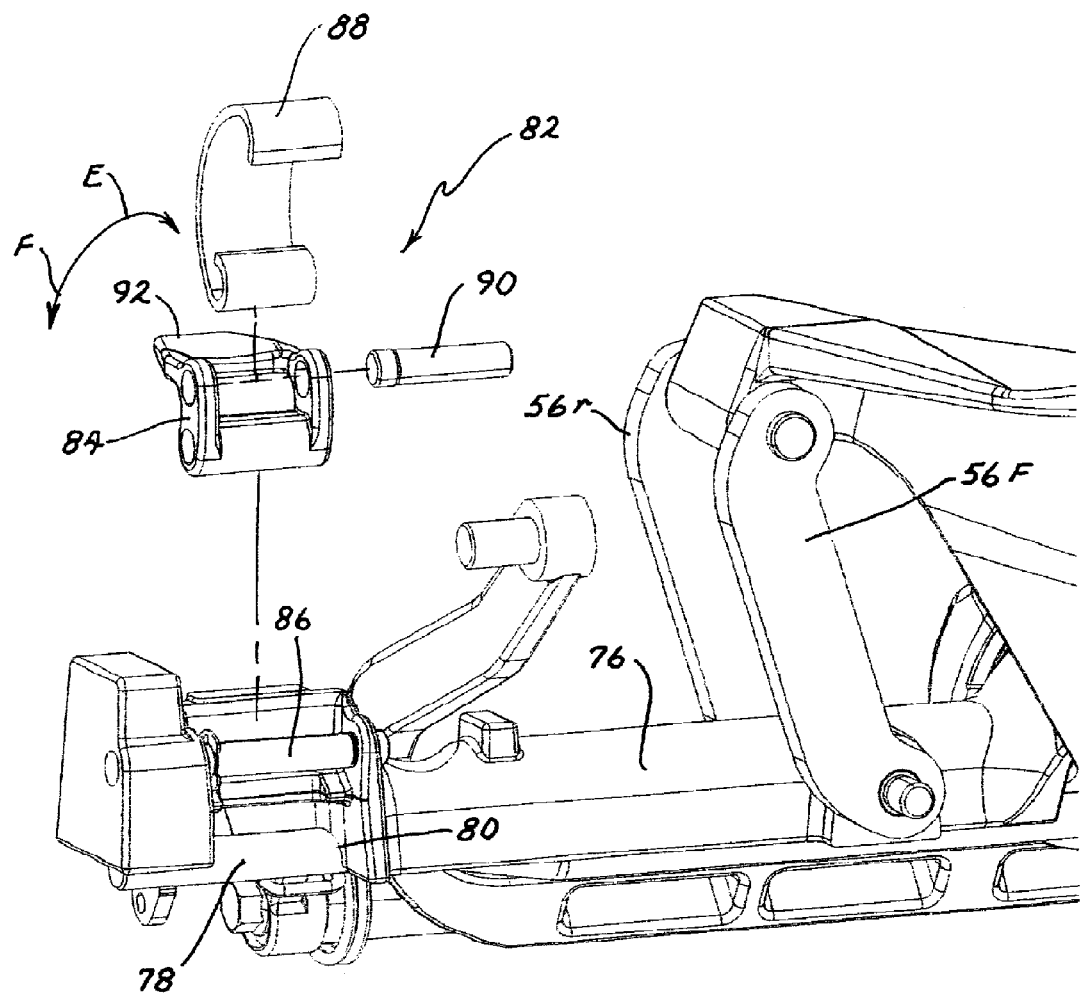
FIG. 15 is an exploded perspective view of the open clamp shown in FIG. 13.

As shown in FIGS. 12 and 15, the underside of cross member 76 has a plurality of downwardly facing, U-shaped notches 80 at either end thereof. The top of cross rod 78 fits up into notches 80. In addition, as shown in FIGS. 13 and 14, cross member 76 has a pair of clamps 82 disposed at either end thereof.

As shown in FIG. 15, each clamp 82 includes a pivotal clamp body 84 that is pivotally journalled on a first pivot pin 86 carried on cross member 76. Clamp body 84 carries a pivotal J-shaped hook 88 on a second pivot pin 90. When clamp 82 is closed, hook 88 of clamp 82 is positioned underneath cross rod 78 to receive cross rod 78 and to draw cross rod 78 tightly up against notches 80 in cross member 76. When clamp 82 is open, hook 88 has been released from engagement with cross rod 78 and has been rotated out of the way of cross rod 78 to release the clamping engagement of cross rod 78 to cross member 76.

Clamp body 84 includes a rearwardly extending tab or finger 92 to allow the user to manually open clamp 82 by rotating clamp body 84 about first pivot pin 86 by pushing up and forwardly on finger 92 in the direction of the arrow E in FIG. 15. Assuming clamp 82 was closed to begin with when this happens, the rotation of clamp body 84 causes hook 88 to lower and drop out of its clamping engagement against the bottom of cross rod 78. Once hook 88 has released cross rod 78 in this manner, the user can then flip hook 88 forwardly out of the way of cross rod 78. If the user then pushes down and rearwardly on the raised finger 92 in the direction of the arrow F in FIG. 15 to reversely rotate clamp body 84 relative to cross member 76, hook 88 will then be elevated but will not catch or clamp beneath cross rod 78. In fact, in the open position of clamp 82, the user can even manually flip hook 88 all the way up so that it is resting vertically upright or even lying atop finger 92. Referring to FIGS. 13 and 14, an open clamp 82 is illustrated on the left of cross member 76 and a closed clamp 82 is illustrated on the right of cross member 76.

To relock clamps 82 in their clamping orientation, the user first pushes up and forwardly on finger 92 in the direction of the arrow E and flips hook 88 down to allow the J-shaped end of hook 88 to get beneath cross rod 78. Then, with hook 88 positioned to catch against cross rod 78, the user simply pushes down and rearwardly on finger 92 in the direction of arrow F to close clamp body 84 and to draw hook 88 upwardly into a tight locking or clamping relationship to cross rod 78. Thus, clamps 82 disclosed herein are one form of a simple, manually operable clamp adapted for temporarily clamping cross rod 78 of carrier frame 52 to cross member 76 of carrier frame 52. Other types of clamps or temporary securing devices could be used.

When clamps 82 are both released, cutting unit 28, including that portion of suspension 30 comprising cross rod 78 and pitch arms 54 attached to cutting unit 28, can separate from the rest of suspension 30. This separation is depicted in FIG. 14. It is preferred that there be an upward biasing force of a small amount, e.g. 5 pounds, on upper and lower arms 32, 34 of suspension 30. Thus, as soon as clamps 82 are released, the rest of suspension 30 will lift slightly above cutting unit 28 far enough to clear cross rod 78 and pitch arms 54. The operator or mechanic can then very easily roll cutting unit 28 out from under upper and lower arms 32, 34 to remove cutting unit 28.

Installing cutting unit 28 is a simple reversal of the above steps. The operator or mechanic rolls cutting unit 28 back into place beneath upper and lower arms 32, 34 and positions cross rod 78 beneath cross member 76. Then, the operator or mechanic takes both hands and pushes down on opposite ends of cross member 76 until notches 80 on cross member 76 engage against the top of cross rod 78. While holding this downforce, the operator or mechanic can then close clamps 82 by pushing down on fingers 92 in the direction of the arrow F using his or her thumbs until clamps 82 have tightly clamped cross rod 78 to cross member 76. The installation is then complete.

The manner in which cutting unit 28 can be easily removed and installed is unparalleled in the mower art. When any grass baskets 140 are removed from cutting units 28, the two front cutting units 28*f* are completely accessible from the front. So, too, is center rear cutting unit 28*r* after pivotal footrest 22*p* is flipped to the side, as described earlier. To remove any cutting unit 28, the operator or mechanic simply has to release two clamps 82 with a couple flicks of the wrist and without requiring any tools. No attachment bolts or screws have to be laboriously unbolted or unscrewed. Once clamps 82 are unclamped, the upward bias on the rest of suspension 30 causes suspension 30 to simply lift on its own up above cutting unit 28 which remains on the ground. The operator or mechanic can them simply roll cutting unit 28 forwardly to get it out from under suspension 30 and to remove it from mower 2. Cross rod 78 that remains on cutting unit 28 forms a convenient handle for rolling cutting unit 28 out. Removal of a cutting unit, which was a laborious and difficult process in many cases in the prior art, now takes only a few seconds.

Easily Removable Cutting Unit Motor

Cutting unit 28 carries a motor 94 of some type, typically a hydraulic motor though electric or other motors could be used. Such motors are often coupled to one of the side plates 96 of the frame of cutting unit 28. Some type of drive connection extends between the drive shaft of the motor and the shaft of rotatable cutting reel 60 carried on cutting unit 28. As the drive shaft of the motor is rotated, the shaft of cutting reel 60 rotates. Thus, the helical blades of cutting reel 60 sweep the standing grass against a sharpened cutting edge of the bedknife to shear the standing grass off at whatever height of cut is determined by the vertical position of front and rear rollers 66 relative to the frame of cutting unit 28. Rollers 66 that are in relatively raised positions relative to the cutting unit frame mean lower heights of cut and rollers 66 that are relatively in lowered positions on the cutting unit frame mean higher heights of cut.

Figure 16:
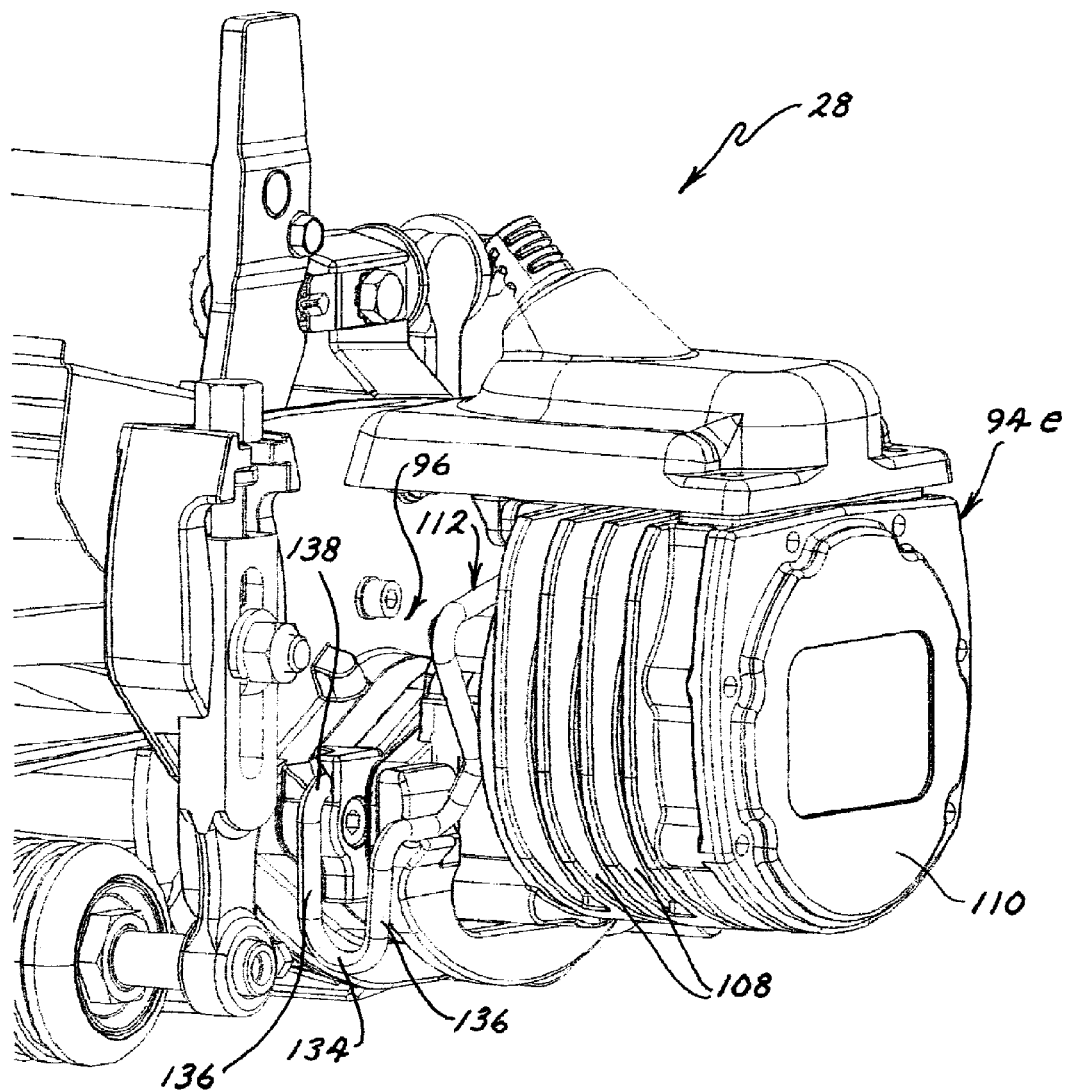
FIG. 16 is a front perspective view of one end of the reel cutting unit of FIG. 3, particularly illustrating an electric drive motor that powers the rotatable reel attached to the frame of the cutting unit by a pivotal wire form.
Figure 17:
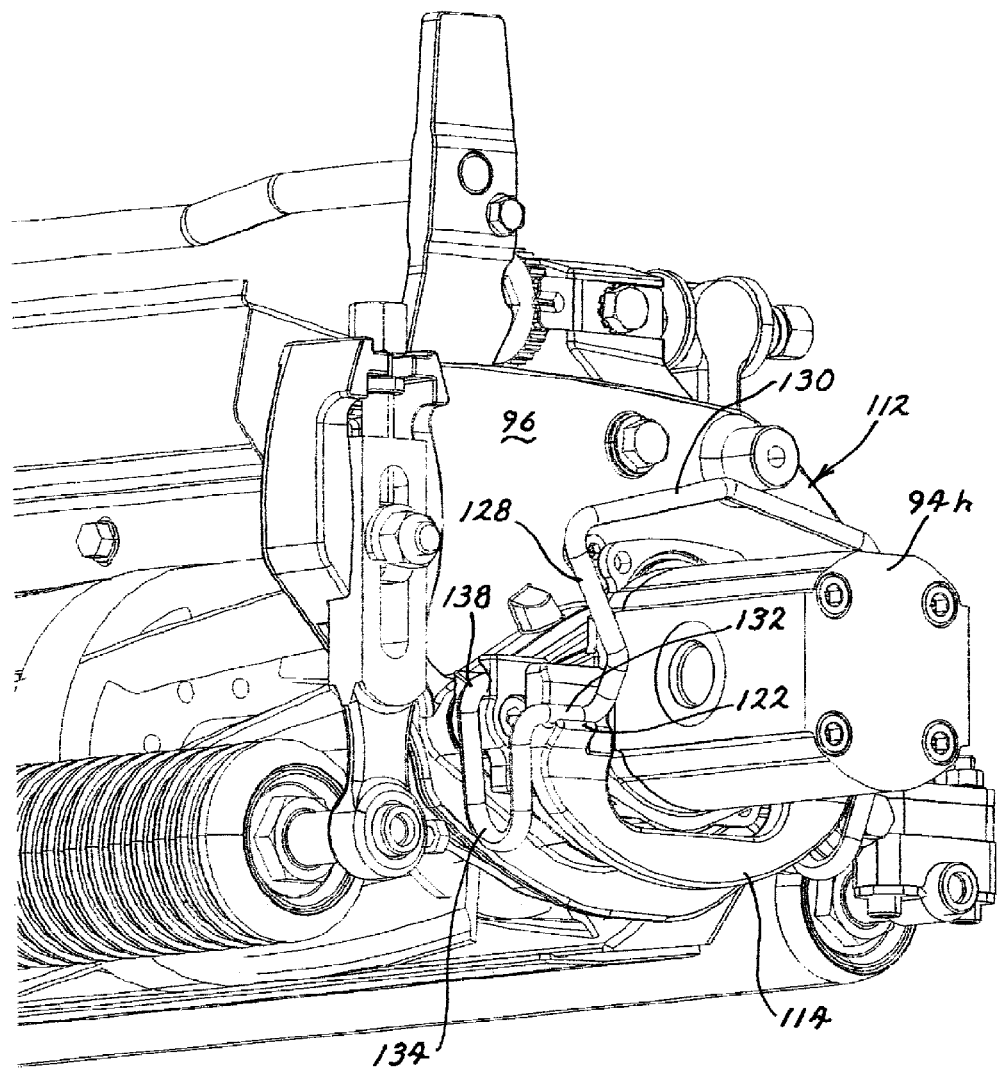
FIG. 17 is a perspective view similar to FIG. 16, but with a hydraulic drive motor in place of the electric motor of FIG. 16, and particularly illustrating the wire form used to attach the drive motor and how that wire form coacts with a cradle that forms a pair of seats for receiving portions of the wire form.
Figure 18:
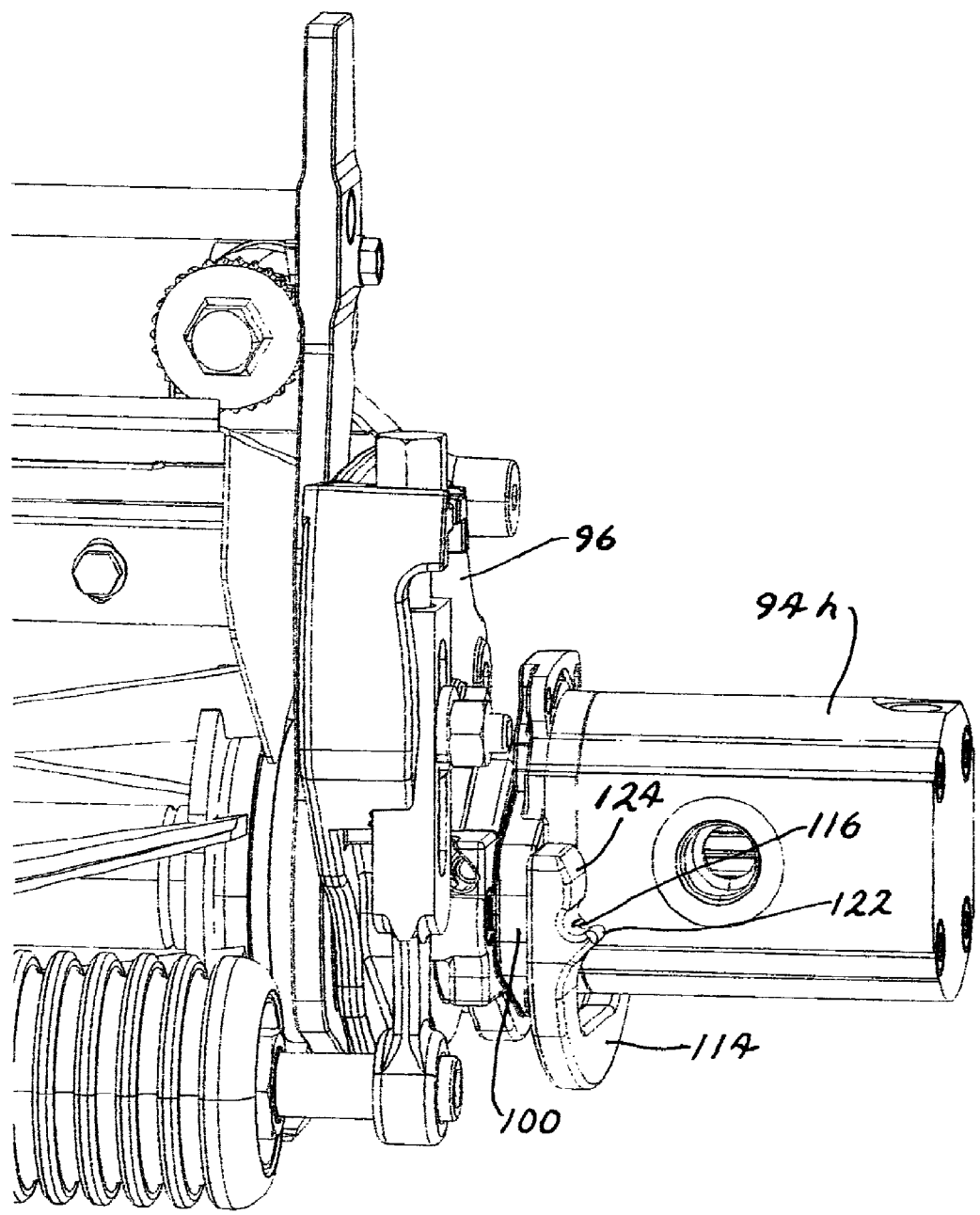
FIG. 18 is a perspective view similar to FIG. 17, but from a slightly different angle, to better show one of the wire form receiving seats of the cradle.

As a part of the service friendly nature of mower 2 of this invention, motor 94 used on cutting unit 28, whether such motor 94 be a hydraulic motor as shown, an electric motor, or some other type of motor, is easily and quickly removable from the frame of cutting unit 28. This aspect of the invention is shown in FIGS. 16-20. An electric motor 94*e* is depicted in FIG. 16 while a hydraulic motor 94*h* is depicted in FIGS. 17-20.

Figure 20:
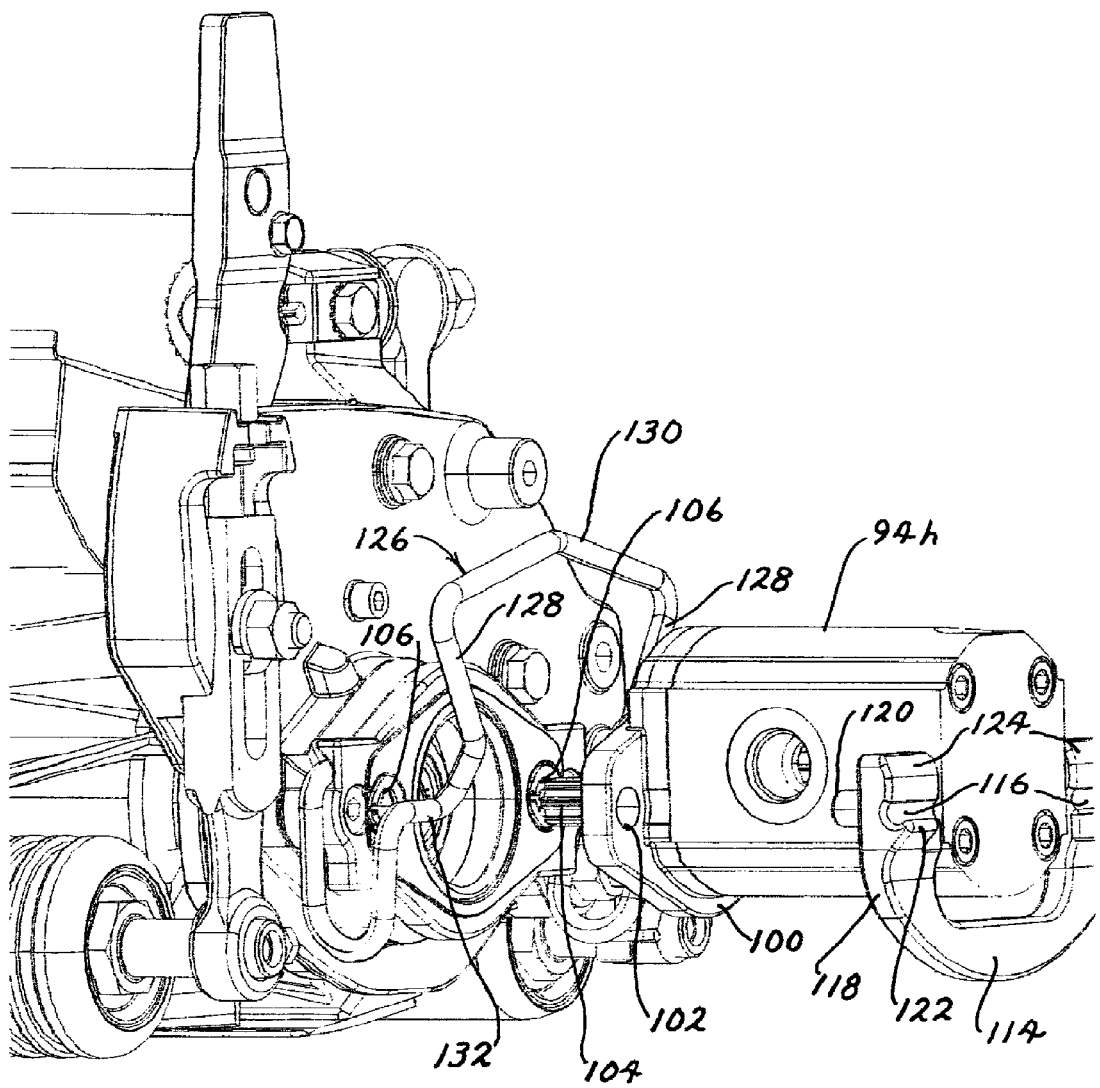
FIG. 20 is a perspective view similar to FIG. 19, but showing the seat forming cradle having been slid to the side of the drive motor to illustrate that the cradle and drive motor are two separate pieces that are merely clamped together by the wire form when the drive motor is held or attached to the reel cutting unit by the wire form.

Referring first to FIG. 20, motor 94 has an enlarged attachment flange 100 at one end. Flange 100 has a pair of bores 102 on either side of motor 94. One bore 102 on flange 100 is illustrated in FIG. 20, the bore 102 on the other side of motor 94 being obscured. The drive shaft 104 of motor 94 can be seen in FIG. 20 since motor 94 is not yet assembled to the frame of cutting unit 28. In the past, motors of this type have most often been simply directly mounted or bolted to side plate 96 of the frame of cutting unit 28 using attachment bolts that pass inwardly through the bores 102 on flange 100 of motor 94 and into corresponding openings 106 in side plate 96.

Motor 94 as depicted in FIGS. 17-20 does not show the hydraulic hose connections thereto. These extraneous portions of motor 94, which are not essential to understanding the quickly removable nature of motor 94, have simply been removed from FIGS. 17-20.

Instead of using attachment bolts or screws, motor 94 is attached to side plate 96 using a pivotal wire form 112 and a cradle 114 having a pair of seats 116 for coacting with portions of wire form 112 to hold motor 94 against side plate 96 of cutting unit 28. As shown in FIG. 20, cradle 114 is shaped like a horseshoe with two upwardly extending legs 118. Cradle 114 is not integrally formed as part of motor 94, though it could be. Preferably, cradle 114 is a separate piece from motor 94 and thus can be used with existing motors from many manufacturers without the need for retooling or redesigning standard, readily available motors. Thus, there is a cost advantage to making cradle 114 a separate piece from motor 94 since it allows common, off the shelf motors 94 to be used to power cutting unit 28. However, cradle 114 is preferably removably fixed to motor 94 or to attachment flange 100 by retaining ring(s) (not shown) so that cradle 114 does not fall off motor 94 during installation and removal of motor 94.

As shown in FIG. 20, legs 118 of cradle 114 on the backside each have an alignment pin 120 that fits through one of the bores 102 on flange 100 and then into an opening 106 therefor on side plate 96 of the frame of cutting unit 28. In a sense, the alignment pins 120 are like the attachment bolts in the prior art except that they only align cradle 114 to flange 100 and to side plate 96 of the frame of cutting unit 28 instead of securing the parts together. The front side of each leg 118 of cradle 114 is shaped to have an upwardly facing, inclined lip 122 forming an open edge of a generally semi-circular seat 116. Seat 116 is below a curved cam 124 located at the top of each leg 118 of cradle 114. Curved cam 124 and seat 116 with the upwardly inclined lip 122 can best be seen in FIGS. 18-20.

Wire form 112 has a U-shaped central grip 126 having a pair of generally vertical legs 128 that terminate in lower ends. Legs 128 of grip 126 are not straight as they extend vertically, but have a couple of inclined sections therein. Similarly, the top 130 of grip 126 is not horizontal, but is formed with a slight V-shape. In any event, grip 126 further includes a horizontal locking pin 132 at the lower end of each of the vertical legs 128 of grip 126. Locking pins 132 extend transversely outwardly. Locking pins 132 are the portions of wire form 112 that will be received in seats 116 formed in cradle 114 when motor 94 is held on or assembled to side plate 96 of the frame of cutting unit 28.

Wire form 112 is pivotally attached to side plate 96 of the frame of cutting unit 28 by a U-shaped section 134 of wire form 112 connecting each side of grip 126 to side plate 96. The U-shaped sections 134 of wire form 112 extend in planes that are generally perpendicular to the plane of grip 126 of wire form 112. The legs 136 of each U-shaped section 134 can be compressed towards one another or pulled away from one another to some degree and the U-shaped section 134 can have a small amount of rotation relative to side plate 96 at the end 138 where it is clamped to side plate 96. This movement in the U-shaped sections 134 of wire form 112 is sufficient to allow the locking pins 132 of wire form 112 to be placed into or pulled out of seats 116 in cradle 114.

As shown in FIG. 16, motor 94 has been assembled onto side plate 96 with cradle 114 having been slid in and abutted against flange 100 on motor 94. Locking pin 132 on each of the vertical legs 128 of grip 126 is received in the upwardly facing, semi-circular seat 116 atop the upwardly inclined lip 122 thereof with grip 126 extending up above and around motor 94 of motor 94. In this position, each locking pin 132 is below curved cam 124 on cradle 114. The force of wire form 112 and the engagement of the locking pin 132 on either side of motor 94 within seat 116 on either side of cradle 114 are sufficient to tightly hold motor 94 to side plate 96 of the frame of cutting unit 28.

If the user wishes to remove motor 94 from cutting unit 28, the only thing the user need do is to reach down, place his or her hand on top 130 of grip 126 and pull firmly upwardly on grip 126. As the user does so, the U-shaped sections 134 of wire form 112 can pivot or flex enough to allow the locking pins 132 to be forced up past the curved cams 124 on cradle 114 until the locking pins have risen past curved cams 124. At this point, there is nothing holding cradle 114 to side plate 96.

Figure 19:
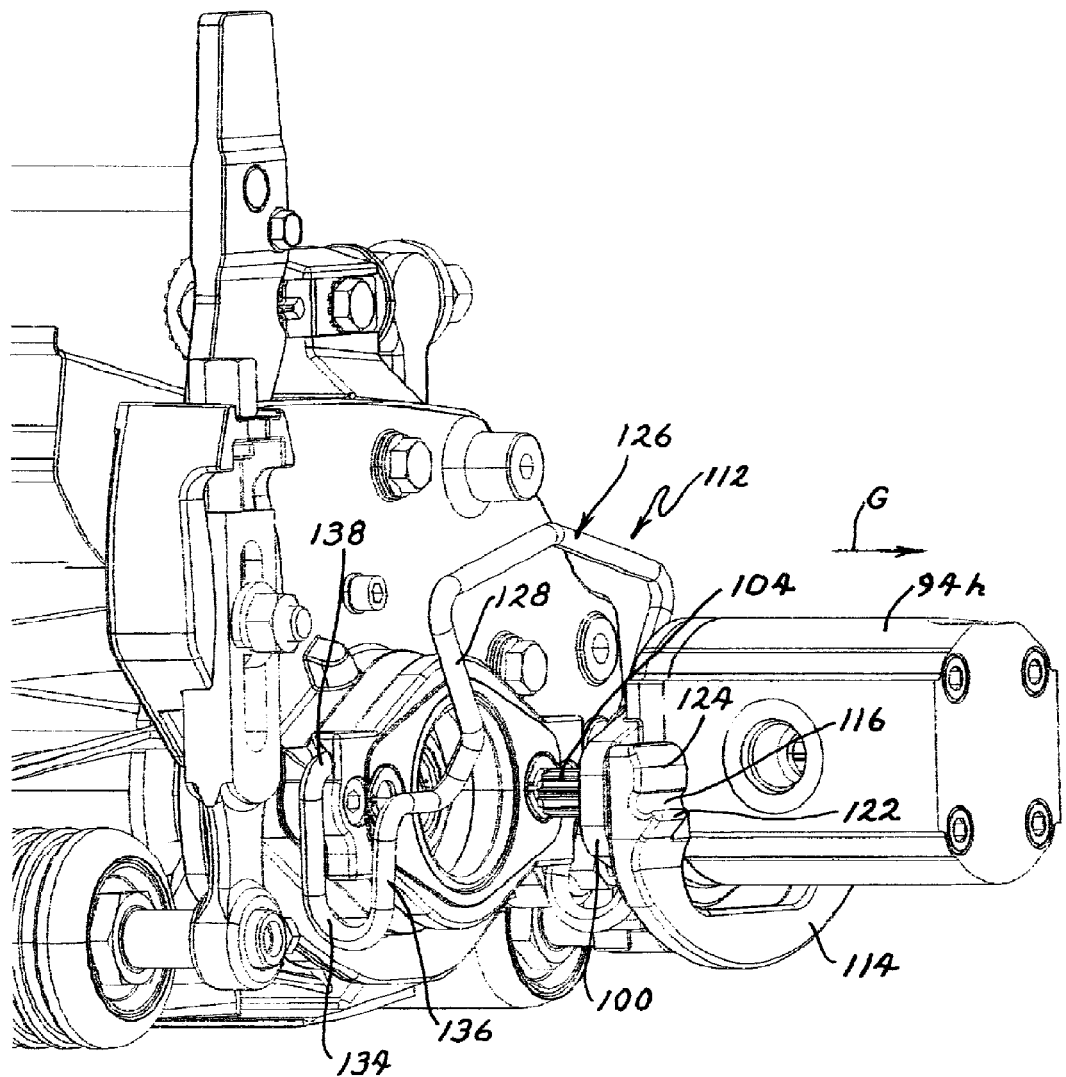
FIG. 19 is a perspective view similar to FIG. 17, particularly illustrating the drive motor and the seat forming cradle having been disengaged from the wire form and having been slid to the side to remove the drive motor from the reel cutting unit.

Thus, motor 94 can simply be slid off to the side of side plate 96 as indicated by the arrow G in FIG. 19.

The hydraulic hose or other drive connections to motor 94 will also have to be removed, either prior to or after the disconnection of motor 94 from side plate 96, if motor 94 is to be completely removed and swapped out with another motor. However, if motor 94 can remain attached to the hydraulic hoses or drive connections at least temporarily, the disconnection of such hoses or connections may not be necessary. Motor 94 can simply be slid off and laid to the side of cutting unit 28 with the hoses or drive connections still attached. But, in either case, motor 94 can be simply and quickly disconnected from cutting unit 28 by pulling up on grip 126 of wire form 112 to disengage wire form 112 from seats 116 formed in cradle 114.

It is similarly easy to reattach motor 94. To do this, cradle 114 as carried on flange 100 has its alignment pins 120 passing through bores 102 in cradle 114. The assembled cradle 114 and motor 94 are abutted against side plate 96 with the alignment pins 120 passing into the openings 106 therefor on side plate 96. Then, the user need only grab top 130 of grip 126 and push down on grip 126. This will flex and pivot the U-shaped bottom sections 134 of wire form 112 sufficiently to allow the locking pins 132 to be cammed over the cam surfaces 124 with locking pins 132 finally snapping into seats 116 provided on cradle 114. When this occurs, the force of wire form 112 will hold motor 94 firmly in place on cutting unit 28.

As can be appreciated, removing and attaching motor 94 to cutting unit 28 now takes only seconds. In conjunction with the quick and easy attachment and removal of cutting unit 28 from mower 2, the operator or mechanic's task in providing service is made vastly easier. Cutting unit 28 can be pulled out and removed very quickly and without tools by opening two clamps 82. Once this is done, motor 94 driving cutting reel 60 can be removed from cutting unit 28 simply by pulling up on grip 126 of wire form 112, again without using any tools, and by then sliding motor 94 off to the side. The laborious bolting and unbolting known in the prior art is no longer required for either task.

Obviously, when both of these quick removal features are used together on the same mower 2, the ease of service is enhanced to its fullest extent. However, either feature could be used independently of the other. For example, one could use the easy removal feature of cutting unit 28 using the two clamps 82 on a cutting unit 28 not having the quick removal of motor 94 provided by wire form 112, and vise versa.

The Grass Basket with Balanced Cutting Unit Weight Distribution

Each cutting unit 28 can be equipped with a grass basket 140 that may be optionally attached to cutting unit 28 for collecting grass clippings generated by the operation of cutting unit 28. As is typical in many prior art reel cutting units, grass basket 140 is mounted forwardly of rotatable cutting reel 60 of cutting unit 28. Grass clippings are thrown or deflected forwardly from cutting reel 60 to be collected in grass basket 140. Periodically, grass basket 140 may be removed from cutting unit 28 for dumping of the grass clippings at some disposal or dump location. Cutting unit 28 can be operated without grass basket 140 attached thereto if the operator does not wish to collect the grass clippings.

Grass basket 140 is supported on a grass basket support member 142 that is itself pivotally supported on cutting unit carrier frame 52. Grass basket support member 142 is U-shaped having a transverse cross beam 144 and pair of upwardly and forwardly extending support arms 146. Cross beam 144 includes an outwardly extending trunnion 148 at either end. Each trunnion 148 is rotatably received in a pivot hub 150 carried at either end of cross member 76 of carrier frame 52. See FIG. 12 for an illustration of trunnions 148 and pivot hubs 150 in an exploded, non-assembled relationship relative to each other.

Figure 26:
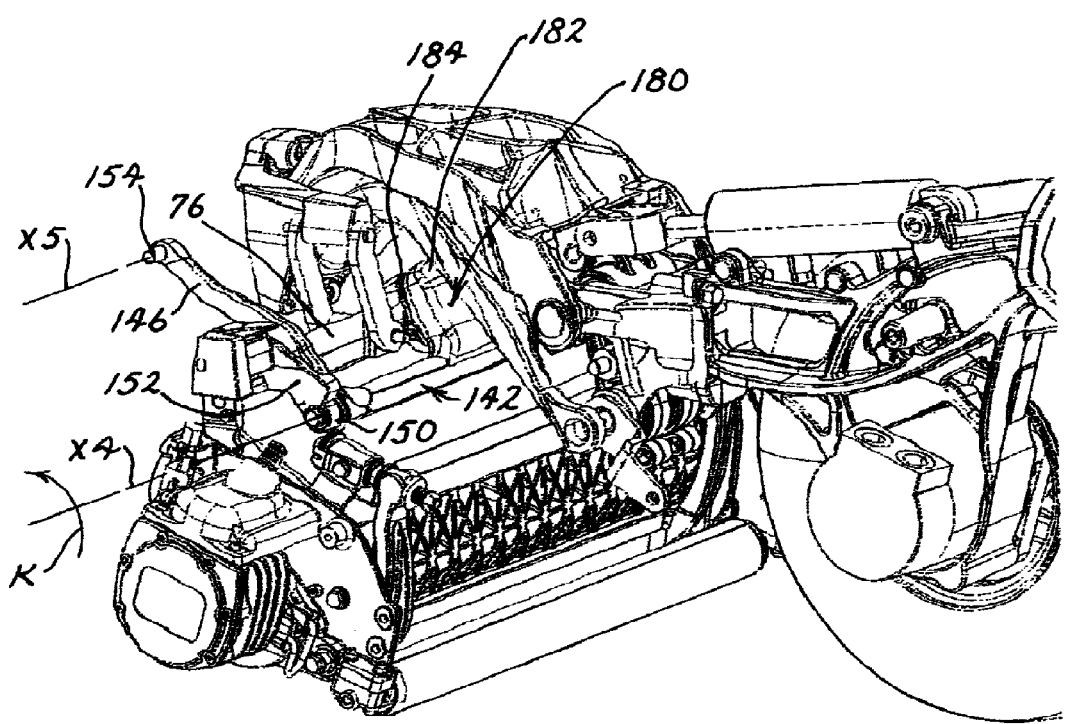
FIG. 26 is a rear perspective view of the reel cutting unit of FIG. 3, particularly illustrating the grass basket support member from the rear thereof but without the grass basket being attached to the grass basket support member.
Figure 27:
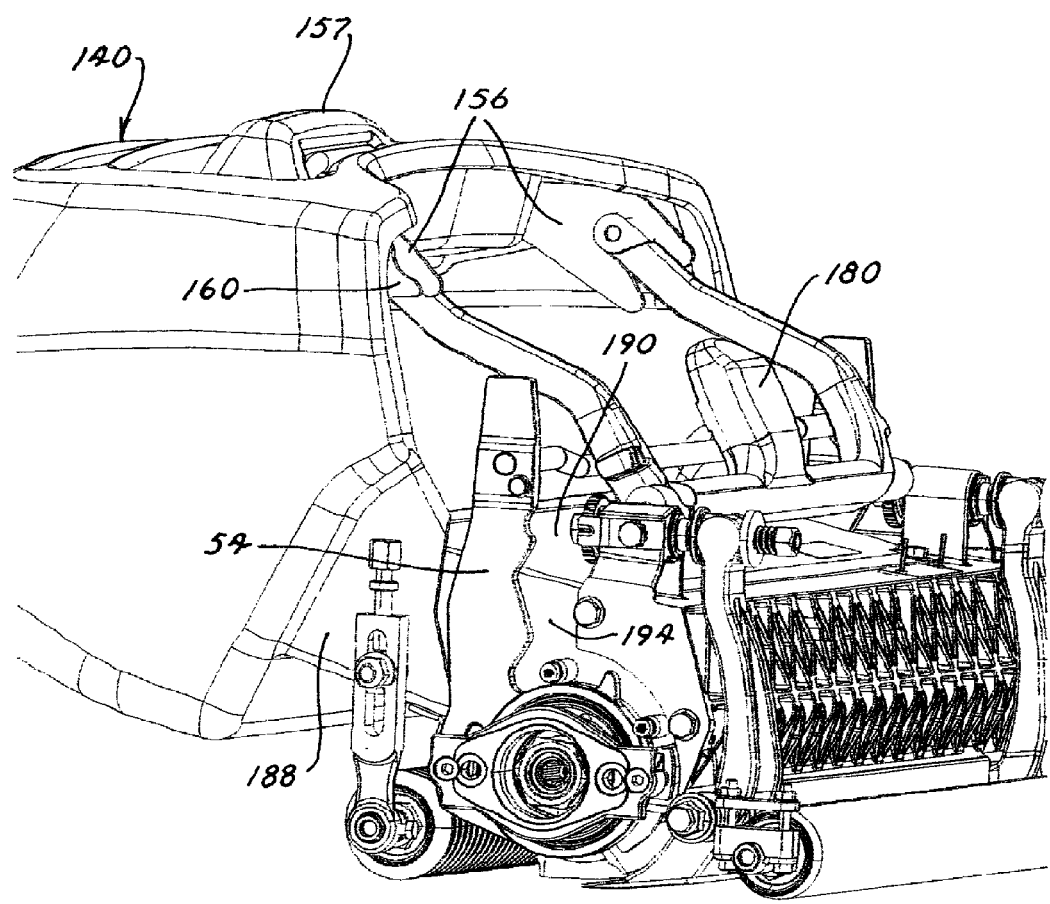
FIG. 27 is a perspective view similar to FIG. 24, but showing the grass basket in an assembled form installed on the grass basket support member but with a portion of the frame of the reel cutting unit having been removed to show how a side wall of the grass basket abuts against a forward facing edge of one of the pitch arms of the reel cutting unit.

Pivot hubs 150 are carried on arms 152 that extend rearwardly from cross member 76 of carrier frame 52 as best shown in FIG. 26. Pivot hubs 150 define the pivot axis of grass basket support member 142, which is indicated as x4 in FIGS. 4, 23, 24 and 26. Pivot axis x4 is located rearwardly of cross member 76 of carrier frame 52.

Figure 22:
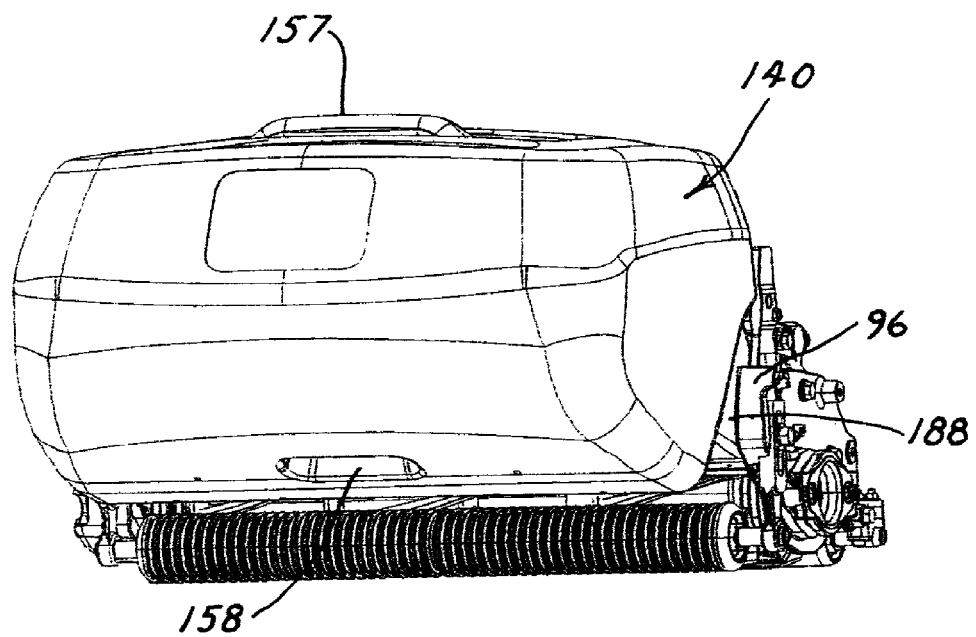
FIG. 22 is a perspective view similar to FIG. 21, but illustrating the reel cutting unit having been installed on the grass basket support member.
Figure 23:
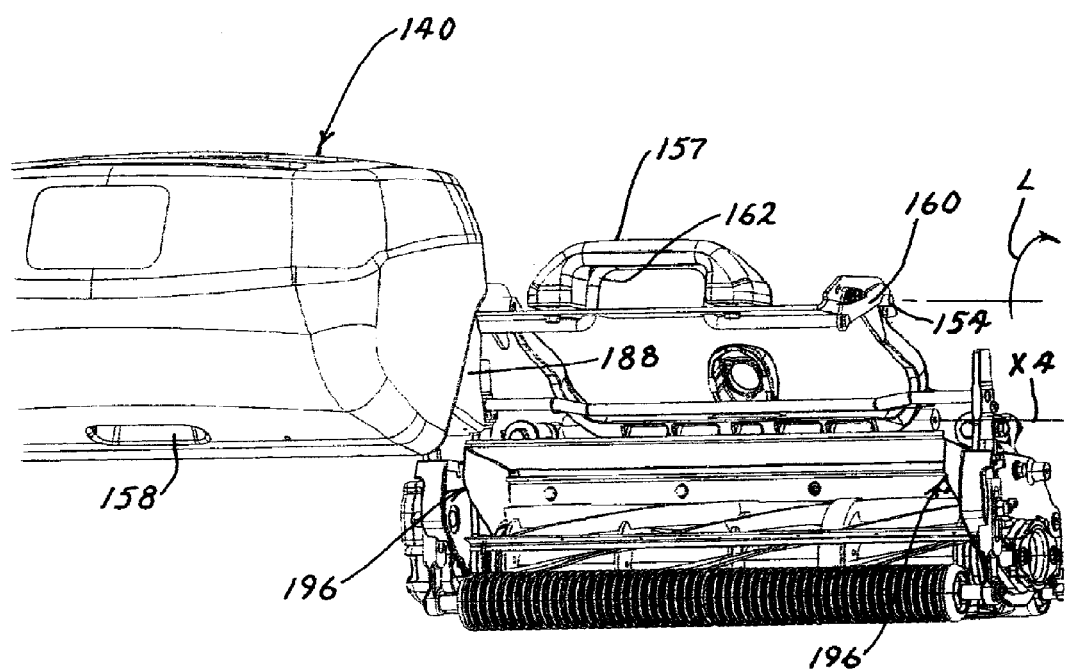
FIG. 23 is a perspective view similar to FIG. 22, but showing the grass basket having been separated into two exploded basket and top hand grip portions for the purpose of clarity with such portions normally being fixed to one another.
Figure 24:
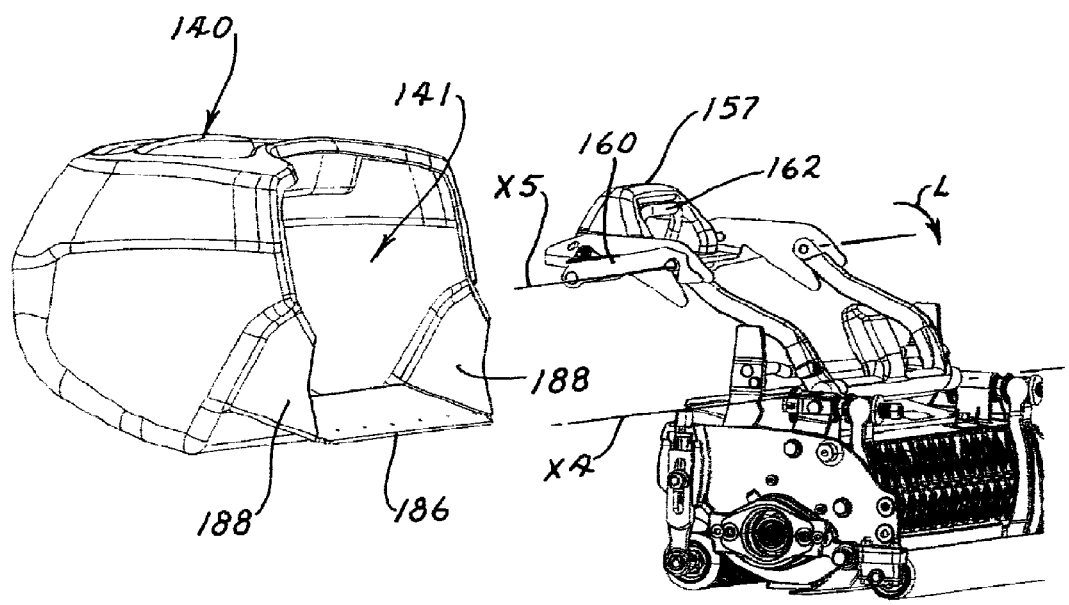
FIG. 24 is a perspective view similar to FIG. 23, but taken from the rear of the reel cutting unit rather than from the front of the reel cutting unit.
Figure 25:
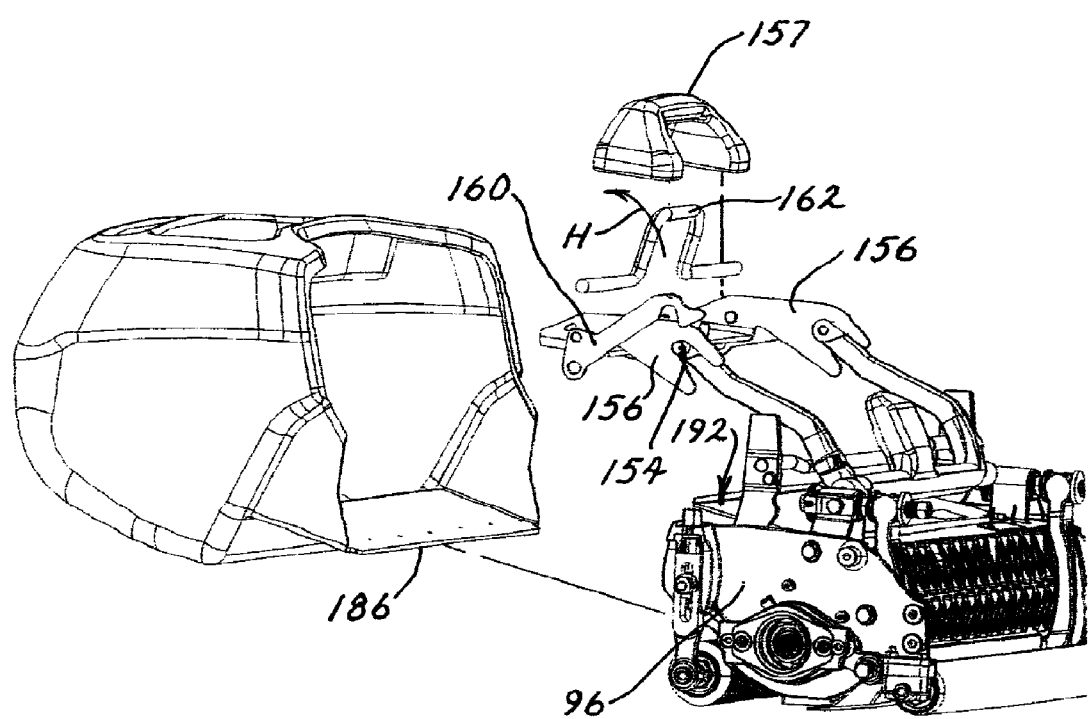
FIG. 25 is a perspective view similar to FIG. 24, but showing the rear portion of the grass basket in exploded form to better illustrate the attachment of the grass basket to the grass basket support member.

Support arms 146 of grass basket support member 142 have a pair of outwardly extending support pins 154 that are each aligned on a common axis indicated as x5 in FIGS. 23, 24 and 26. Referring to FIGS. 24 and 25, the rear of grass basket 140 has a pair of slotted fingers 156 that fit around support pins 154 to attach grass basket 140 to grass basket support member 142. The top of the basket includes a top hand grip 157. Top hand grip 157, in conjunction with a bottom hand hold 158 molded into the bottom of grass basket 140 near the front thereof as shown in FIG. 22, allows the operator to lift grass basket 140 off mower 2 or to place grass basket 140 onto mower 2.

Two pivotal latches 160 are used to lock or secure grass basket 140 onto support pins 154 of grass basket support member 142. Pivotal latches 160, only one of which is shown in FIGS. 24 and 25, are operated by a pivotal latch release 162 that is carried under top hand grip 157. Latch release 162 can be squeezed in the direction of the arrow H in FIG. 25 by the operator's hand when the operator is gripping top hand grip 157. When latch release 162 is so gripped and squeezed, pivotal latches 160 rotate up and out of contact with support pins 154 as shown by the one latch 160 that can be seen in FIG. 25. This releases grass basket 140 for removal from or installation on support pins 154. When latch release 162 is not being gripped and squeezed by the operator, spring biasing on latch release 162 causes latches 160 to rotate downwardly until they engage against and lock on support pins 154 to secure grass basket 140 to support pins 154. This is what retains grass basket 140 on grass basket support member 142.

FIGS. 23-25 show top hand grip 157, slotted fingers 156, latches 160 and latch release 162 separated away from the basket portion of grass basket 160, but only for the sake of clarity. Normally, the hand grip 157, slotted fingers 156, etc. are carried on and united with the basket portion as shown in FIGS. 3, 4, 27 and 28.

In any event, when grass basket 140 is attached to and carried by grass basket support member 142, it is in a position to catch grass clippings being generated by cutting unit 28 and thrown forwardly into grass basket 140 through an open rearwardly facing mouth 141 of grass basket 140. See FIG. 24. As the clippings accumulate in grass basket 140, the weight of grass basket 140 naturally increases. However, that weight is transferred to cutting unit 28 at the connection of the pitch arms 54 to the cutting unit 28.

As noted earlier, the pitch arms 54 connect to the cutting unit 28 around the axis of rotation of the cutting reel 60. The axis of rotation of the cutting reel 69 is midway or substantially midway between the rotational axes of front and rear rollers 66 of cutting unit 28. Accordingly, the weight of grass basket 140 is equally distributed between front and rear rollers 66. In other words, as the weight of grass basket 140 increases, the amount of weight seen by front roller 66f increases by an amount equal to the increase seen by rear roller 66r. Front roller 66f does not become more heavily loaded than rear roller 66r.

This equal weight distribution between front and rear rollers 66 is preferred since it helps minimize any change in the quality of the cut that might occur from the increasing weight of grass clippings in grass basket 140. The mower designer usually takes into account the weight distribution of cutting unit 28 when grass basket 140 is not attached, or at least when grass basket 140 is empty, when attempting to achieve the best quality of cut that is possible. With grass basket 140 in place, the quality of cut will be adversely affected by the weight of grass basket 140 and particularly by the dramatically increasing weight of grass basket 140 as it fills with clippings. This adverse affect is undesirably magnified if front roller 66f is more heavily loaded with the basket weight than rear roller 66r. By keeping the weight distribution substantially equal between front and rear rollers 66, the adverse changes in the quality of cut that occur with an increasing basket weight are kept to a minimum.

The Counterbalanced Grass Basket

While adverse changes in the quality of cut from increasing grass basket weight can be minimized as noted above, such changes are not eliminated. Cutting unit 28 will have one quality of cut when grass basket 140 is empty or not installed on cutting unit 28 and a second quality of cut when grass basket 140 is fully loaded with perhaps 30 or more pounds of grass clippings. Keeping this weight equally distributed between front and rear rollers 66 is a desirable thing to do.

To eliminate any adverse changes in the quality of cut from increasing grass basket weight for a grass basket 140 that is carried on cutting unit 28, a further improvement has been added to mower 2 to deal with this increasing weight. This improvement comprises an active counterbalance system that increases the upward biasing force on upper and lower arms 32, 34 of cutting unit suspension 30 for each 5 pound increment of change in the weight of grass basket 140. This improvement is an optional addition to the balanced weight distribution feature noted earlier. For example, a more basic or standard mower would be equipped with the balanced weight distribution and a more deluxe or premium mower would be equipped with both the balanced weight distribution and the active counterbalance system that will now be described.

The active counterbalance system will be described first with reference to FIGS. 8 and 9. A plurality of counterbalance torsion springs 164 are located on a portion of mower frame 4 on the pivot axis x2 of lower arm 34. Springs 164 are located between rear ball joints 42r of lower arm 34. However, springs 164 remain on the pivot axis x2 and do not move with rear ball joints 42r of lower arm 34 when lower arm 34 moves off pivot axis x2 when cutting unit 28 is being lifted into the service position thereof. Springs 164 always remain in place on pivot axis x2.

Figure 9:
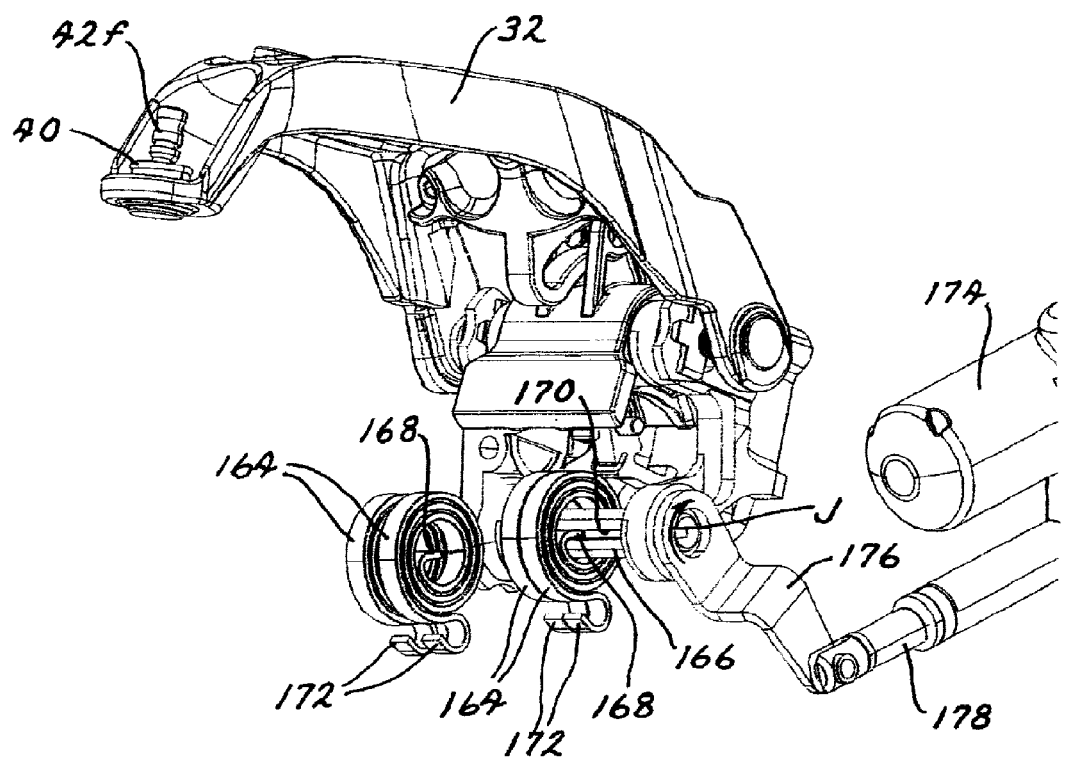
FIG. 9 is a front perspective view similar to FIG. 8, but with the lower arm having been removed, with a pair of grass basket counterbalance torsion springs having been exploded forwardly, and with the counterbalance actuator having been added thereto.

Referring to FIG. 9, springs 164 are located around a pivotal adjustment shaft 166 that is rotatably journalled in that portion of mower frame 4 that mounts springs 164. One end 168 of each spring 164 is hooked into a slot 170 in shaft 166. The other end 172 of spring 164 is free and is adapted to simply abut against some portion of lower arm 34 of suspension 30. Thus, suspension 30 will be biased upwardly by the abutting engagement of the free ends 172 of spring 164 against lower arm 34 with the amount of the biasing force depending upon how tightly wound springs 164 are around shaft 166. The more tightly wound, the higher the biasing force.

A counterbalance actuator 174 extends between mower frame 4 and a pivotal link 176 that is attached to one end of shaft 166. Actuator 174 can comprise either a hydraulic or an electric actuator or the like. Actuator rod 178 is pivotally connected to the lower end of link 176. As actuator rod 178 is extended, link 176 and shaft 166 are rotated in the direction of the arrow J in FIG. 9 to more tightly wind springs 164 around the axis of shaft 166.

Actuator rod 178 is automatically extended in concert with the increase in weight of grass basket 140. The extension occurs without requiring the operator to manually control or activate actuator 174. A load sensor (not shown) of some type is positioned between grass basket support member 142 and cross member 76 of carrier frame 52. For example, grass basket support member 142 has a central, upwardly extending, forwardly facing channel 180 forming a generally cylindrical housing 182 at the upper end thereof. See FIGS. 21 and 26. This housing 182 on grass basket support member 142 is directly behind and faces a similar housing 184 located at the center of cross member 76 of carrier frame 52. The load sensor can be arranged within and between these two housings 182 and 184 to, in effect, be sandwiched between the two.

As grass basket 140 fills with grass clippings and its weight increases, grass basket 140 and grass basket support member 142 will pivot forwardly about the pivot axis x4 in the direction of the arrow K in FIG. 26. This will compress the load sensor between housing 182 on channel shaped member 180 on grass basket support member 142 and housing 184 on carrier frame 52. The compression of the load sensor is an indication of the amount of the weight increase of grass basket 140. The load sensor sends a signal to some type of controller (not shown) on mower 2 so that the weight of grass basket 140 is monitored by the controller.

As noted previously, springs 164 are initially set to provide a small amount of upward biasing force on upper and lower arms 32, 34 even when grass basket 140 is empty. Thus, when grass basket 140 is removed and cutting unit 28 is disconnected from mower 2, upper and lower arms 32, 34 rise up above cutting unit 28 to allow the operator or mechanic to simply roll cutting unit 28 out. This aspect was previously discussed in the section hereof entitled Easily Removable Cutting Unit.

Now, as grass basket 140 increases in weight when grass clippings are being deposited therein, for every 5 lb increase in the weight of grass basket 140, as detected by the load sensor and monitored by the controller, the controller will send an adjustment signal to actuator 174 to wind up springs 164 an amount sufficient to provide an additional 5 lbs of upward spring biasing force on upper and lower arms 32, 34 of actuator 174. This will balance out the increase in the weight of grass basket 140 and return the weight of cutting unit 28 on the ground to its designed nominal amount, whatever that might be. In other words, the weight of cutting unit 28 as it rolls over the ground is kept substantially constant with the increase in weight of grass basket 140 not being transmitted onto cutting unit 28. Instead, this increase in weight is being constantly monitored and counterbalanced in 5 lb. Increments by the active counterbalance system just described.

It would be possible to detect smaller or larger increments of weight increase as the trigger for making an adjustment in the force provided by springs 164. The adjustment could even be done on a substantially continuous basis, though this is not preferred because the system would be almost constantly making an adjustment in spring force. An increment of 5 lbs. has been found by the Applicants herein to not be so large as to dramatically adjust the quality of cut provided by cutting unit 28. Thus, even allowing the weight of grass basket 140 to increase 5 lbs. before making an adjustment in springs 164 will not appreciably adversely affect the quality of cut.

In addition, the counterbalance system can be used to compensate for changes in the cutting unit weight depending upon whether an electric motor 94e or a hydraulic motor 94h is used to power cutting reel 60. Electric motors 94e are typically heavier than hydraulic motors 94h. Thus, if a heavier electric motor 94e is installed, the counterbalance system can be initially set to provide more upward biasing force on the suspension than in the case of when lighter hydraulic motor is installed in an amount sufficient to counteract the increase in weight of the heavier electric motor 94e compared to the hydraulic motor. In other words, the suspension should ultimately provide the same nominal net upward biasing force on cutting unit 28 regardless of variations in weight of the cutting unit 28 that result from changes in the weight of the motor 94 that is installed on cutting unit 28.

It would be possible on mower 2 to delete the counterbalanced grass basket feature. If this were to occur, then it would not be necessary to make grass basket support member 142 a separate member from cross member 76 of carrier frame 52, trunnions 148 and 150 would no longer be needed such that the pivot axis x4 of grass basket support member 142 would disappear, and the housings 182, 184, the load sensor, and the counterbalance actuator 174 would be deleted. In this event, the support arms 146 and support pins 154 would still be used to support grass basket 140 on carrier frame 52, but such support arms 146 and support pins 154 would be fixed to some remaining portion of carrier frame 52, such as cross member 76.

The Dual Pivot Axes of the Grass Basket

Grass basket 140 is actually provided with two pivot axes. The first pivot axis is the axis x4 of grass basket support member 142 relative to carrier frame 52 that carries cutting unit 28. This is the pivot axis about which grass basket 140 rotates or pivots as it fills with grass. This is the pivot axis about which the pivoting motion of grass basket support member 142 is detected and sensed by the load sensor as the weight indication used in the active counterbalance system described in the preceding section hereof.

However, grass basket 140 is also free to pivot, at least in a clockwise direction as indicated by the arrow L in FIGS. 23 and 24, about support pins 154 which attach grass basket 140 to grass basket support member 142. The axis x5 of support pins 154 is actually a second pivot axis for grass basket 140. Grass basket 140 can only pivot in the clockwise direction L about the axis x5 as pivoting in the other direction is prevented during normal operation of mower 2. This is due to the fact that grass basket 140 normally rides against pitch arms 54 of suspension 30 to provide controlled clearance of a lower lip 186 of mouth 141 of grass basket 140 relative to cutting reel 60. This aspect of mower 2 will be discussed hereafter in the section hereof entitled Controlled Grass Basket Clearance to the Cutting Reel.

As grass basket 140 fills with grass and its weight increases, grass basket support member 142 can pivot about the axis x4 to accommodate this increase in weight and allow grass basket 140 counterbalance system noted earlier to function. This rotation about the axis x4 in the direction of the arrow K is accompanied by a very slight rotation of grass basket 140 about the axis x5 in the direction of the arrow L. In other words, as the weight of grass basket 140 increases and grass basket support member 142 pivots, grass basket 140 and grass basket support member 142 will jackknife slightly about the axis x5 to permit this pivoting motion of grass basket support member 142 in the direction of the arrow K.

Pivot axis x5 of grass basket 140 is further forward and substantially above the pivot axis x4 of grass basket support member 142. This is important given the fact that the front of grass basket 140 is significantly forward of cutting unit 28 when grass basket 140 is attached to cutting unit 28. Thus, when mower 2 encounters a sharp change in elevation, such as when mower 2 descends a hill and then comes to a flat surface at the bottom of the hill, or vise versa, grass basket 140 will experience the change in elevation before the rest of mower 2. In other words, the front of grass basket 140 will hit the flat surface while the rest of mower 2 is still on the hill.

If only the pivot axis x4 were present and because basket 140 does not pitch with cutting unit 28, the forward propulsive force of mower 2 on grass basket 140 would tend to drive grass basket 140 into the ground at the change in elevation or into the flat surface in the example above. This would roll grass basket 140 forwardly against the ground, thereby damaging grass basket 140 by jamming it into the ground or potentially damaging the rest of mower 2. This is obviously undesirable.

However, when the above noted change in elevation scenario occurs, the presence of the other pivot axis x5 that is forward and higher than the pivot axis x4 permits grass basket 140 to pivot in the direction of the arrow L to accommodate the transitory transition at the change in elevation. Thus, when grass basket 140 is driven against the flat surface in the example noted above, grass basket 140 can sharply pivot or jackknife in the direction of the arrow L. When the rest of mower 2 and cutting unit 28 reach the flat surface, then this temporary sharp rotation will reverse until grass basket 140 reestablishes contact with pitch arms 54 of cutting unit 28. The presence of the second pivot axis x5 thus permits mower 2 to drive over sharp elevational changes between a hill and a flat surface, or at elevational changes in a swale, with grass basket 140 pivoting about the pivot axis x5 as need be to accommodate this.

Controlled Grass Basket Clearance to the Cutting Reel

Grass basket 140 is attached to cutting unit 28 by grass basket support member 142 that is carried on carrier frame 52 for cutting unit 28. Carrier frame 52 is located downstream of two of the three axes of freedom about which cutting unit 28 can move in adapting to changes in ground contour. In other words, carrier frame 52 is located below or downstream of steering head 44, which provides freedom in the z or yaw axis, and is below the pairs or rigid inclined links 56, which provide freedom in the y or roll axis. Thus, grass basket 140 inherently yaws or rolls with cutting unit 28 and maintains a constant clearance relative to cutting unit 28 about the y and z axes.

However, cutting unit 28 is free to pitch about the x axis and the problem remains of how to keep lower lip 186 of mouth 141 of grass basket 140 at a fairly constant and small clearance relative to cutting reel 60. If this clearance is not controlled and kept substantially constant, then grass clippings can dribble out from between grass basket 140 and cutting reel 60 and be deposited in unsightly lumps on the mowed turf surface. For example, if cutting unit 28 can pitch or rock back and forth about the x axis while grass basket 140 does not, the gap between lower lip 186 of grass basket 140 and cutting reel 60 will obviously grow or shrink depending upon the direction of the rocking of cutting unit 28. The clearance will vary and at times will be so large that grass clippings can easily escape down through this clearance.

Figure 28:
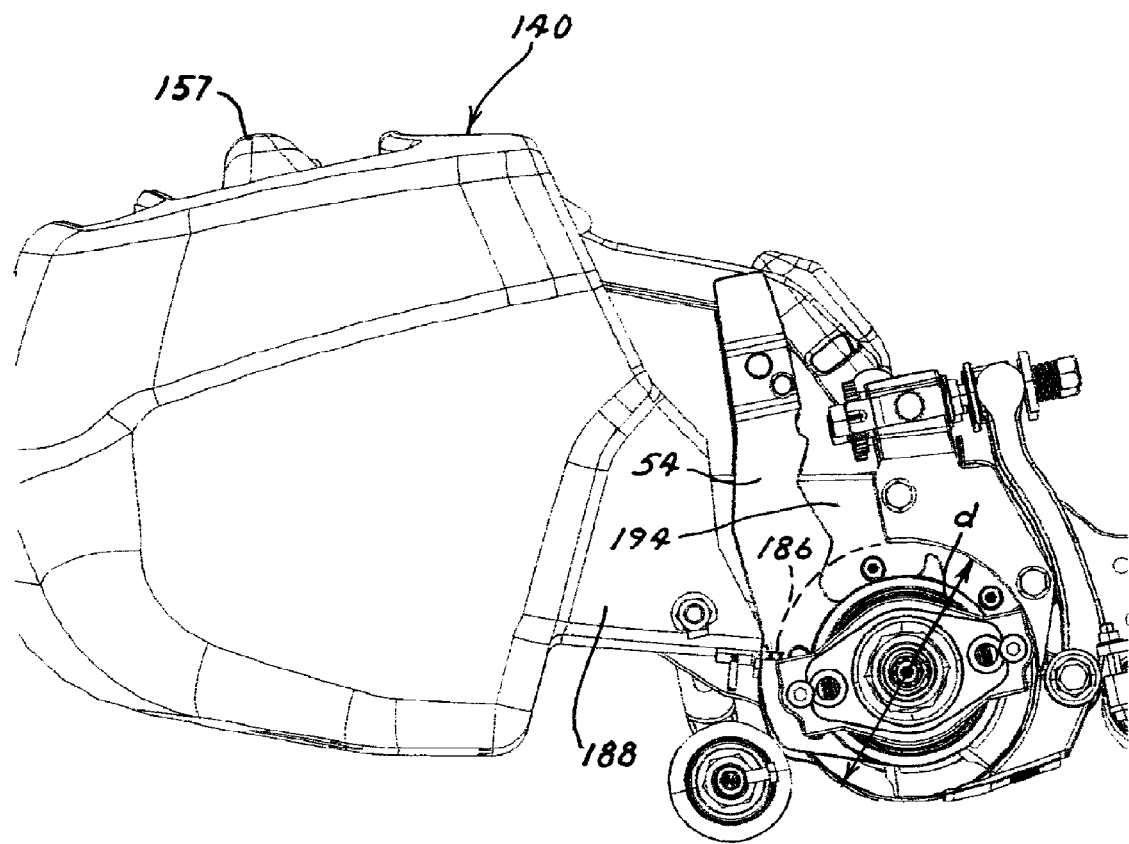
FIG. 28 is a side elevational view of the side wall/forward edge abutment illustrated in FIG. 27, particularly illustrating the circumference of the rotatable cutting reel of the reel cutting unit.

The Applicants have solved this problem by taking advantage of the fact that the weight of grass basket 140, even when empty and also when filled with clippings, tends to rotate grass basket 140 down toward cutting unit 28 in the direction of the arrow K about the pivot axis x4. Grass basket 140 is allowed to swing down about the pivot axis x4 until portions of grass basket 140, namely the lower triangular portions 188 of the side walls of grass basket 140 adjacent to lip 186, abut against the front of the lower ends of pitch arms 54. This is shown in FIG. 28. When this occurs, the lower lip 186 of mouth 141 of grass basket 140 will be maintained a very short distance, e.g. only an eighth of an inch or so, ahead of the nominal diameter of a new or unworn cutting reel 60. The nominal diameter of a new or unworn cutting reel is indicated as d in FIG. 28.

Now, when cutting reel 60 pitches back and forth relative to the ground about the pitch axis x, the clearance between lower lip 186 of mouth 141 of grass basket 140 and the diameter d of cutting reel 60 will remain substantially constant. This is due to the fact that pitch arms 54, or more precisely the pivot hubs 58 of pitch arms 54, are aligned with the axis of rotation of cutting reel 60 so that the axis of rotation of cutting reel 60 is the same as the pitch axis x. Thus, even though cutting unit 28 rocks relative to the pitch axis x, pitch arms 54 and the front edge thereof have a constant unchanging relationship to the pitch axis x and thus to the axis of rotation of cutting reel 60. By abutting a portion of grass basket 140 against the front edge of pitch arms 54, lower lip 186 of mouth 141 of grass basket 140 will stay at the same relative clearance as is desirable even when cutting unit 28 pitches back and forth about the pitch axis x.

The effect of this is to prevent the clearance between lower lip 186 of mouth 141 of grass basket 140 and the outer diameter of cutting reel 60 from varying. This clearance is kept substantially constant and can be kept very small to improve the flow of grass clippings from cutting reel 60 into grass basket 140. There is little or no opportunity for grass clippings to fall through this gap or clearance. Thus, the after cut appearance of the mowed turf is improved since grass clippings will be more effectively collected in grass basket 140 and will not fall out onto the turf. This is particularly important at the previously noted low heights of cut prevailing on golf greens and given the extreme desire of golf course operators for a clean and uniform appearance of the mowed turf on a golf green.

In the event mower 2 did not have a counterbalance feature as described in earlier herein, grass basket 140 would now pivot about axis x5 to cause the abutting engagement of portions 188 with pitch arms 54. Alternatively, if pivot axis x5 were not available, some other horizontal pivot axis would need to be provided for grass basket 140.

The Interleaved Sides of the Grass Basket and the Cutting Unit

Figure 21:
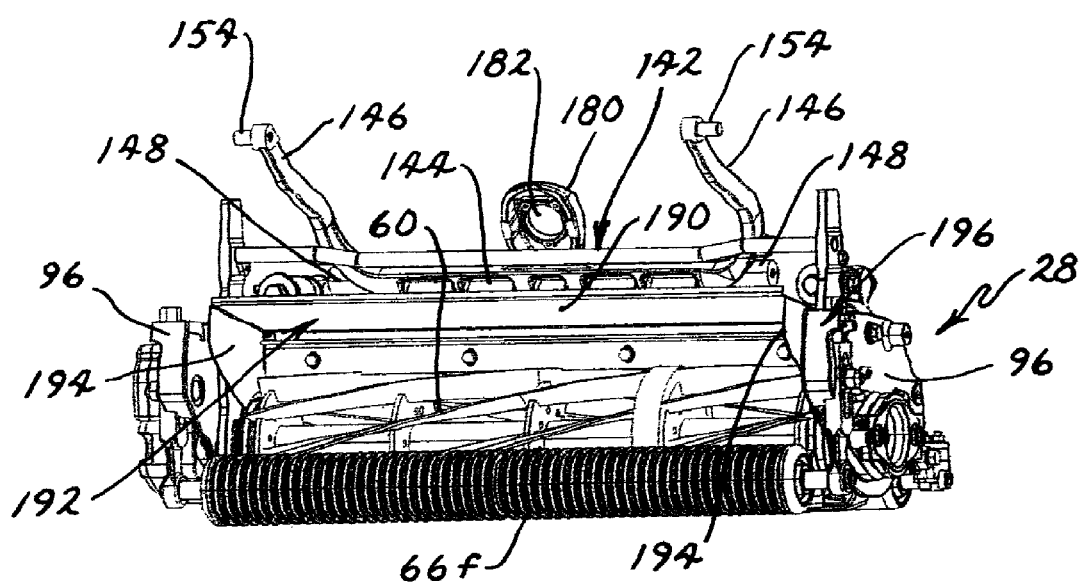
FIG. 21 is a front perspective view of the reel cutting unit of FIG. 3, particularly illustrating the reel cutting unit and the grass basket support member of the reel cutting unit but without the grass basket in place.

Finally, referring to FIGS. 12, 21 and 23, side plates 96 of the frame of cutting unit 28 are no longer directly joined to the top wall of the frame of cutting unit 28 as in prior art mowers. Instead, top wall 190 of cutting unit 28 is part of a U-shaped grass shield 192 in which top wall 190 extends between and is directly joined to a pair of vertically extending side shields 194 at either end of top wall 190. These side shields 194 extend downwardly to a level slightly below the top of cutting reel 60. Side shields 194 are transversely spaced apart by a distance wider than cutting reel 60 so that the top of cutting reel 60 can nest between side shields 194 of grass shield 192. Side plates 96 are joined or fastened to grass shield 192 by a plurality of fastening bolts that connect the rear of side plates 96 to the vertical side shields 194 of grass shield 192 at locations generally rearwardly and/or above cutting reel 60.

This allows a front slot 196 to be formed between side shields 194 and the adjacent side plates 96 of cutting unit 28 with such a gap or slot 196 being present on each side of cutting unit 28. Pitch arms 54 are located in this slot 196. When cutting unit 28 pitches back and forth about the pitch axis x, pitch arms 54 are free to move back and forth in slot 196. As noted earlier, at some point during the lifting of cutting unit 28 from its operative cutting position to its raised transport position, the movement of pitch arms 54 within slot 196 will get stopped out to lock up cutting unit 28 relative to the rest of suspension 30. But, at least during operation of cutting unit 28 in a normal mowing mode, pitch arms 54 can move rather freely within slots 196 as cutting unit 28 pitches back and forth.

Now, it would be possible for the side wall portions 188 of grass basket 140 to engage against the lower ends of pitch arms 54 even if slots 196 between side shields 194 and side plates 96 were not present. This is true because the sides of grass basket 140 need engage only against the lower ends of pitch arms 54. However, the Applicants have chosen to make slot 196 open to the front and to use the separate U-shaped grass shield 192 for a reason. Namely, the side wall portions 188 of grass basket 140 can be made to telescopically fit into or to be interleaved into slots 196. This interleaving is shown best in FIGS. 3, 22, and 27 where the triangular lower side wall portions 188 of grass basket 140 fit between the side shields 194 and side plates 96 on each side of cutting unit 28.

This interleaving engagement between side shields 194 of grass shield 192 and the adjacent side plate 96 further improves the after cut appearance of the mowed turf since it presents a more tortuous path for the escape of the grass clippings from inside grass shield 192 of cutting unit 28. For grass clippings to escape to the side of cutting unit 28 from inside grass shield 192, the clippings now have to travel around the front edge of side shield 194, then pass rearwardly about the interleaved side wall portion 188 of grass basket 140, then around the rear edge of the interleaved side wall portion 188 of grass basket 140, and then forwardly back along the length of the interleaved side wall portion 188 of grass basket 140 before such clippings can pass out around the front edge of side plate 96. Such a tortuous path makes it highly unlikely the many grass clippings can escape through this path. Thus, fewer grass clippings can leak out through the sides of cutting unit 28 but will be effectively collected in grass basket 140. This is an additional improvement that can be utilized to keep as neat and clean an appearance for the mowed turf as is possible.

Use on Other Reel Mowers

The features described above can be used on reel mowers other than the one specifically shown in FIGS. 1 and 2. For example, the various grass basket improvements would be useful on a walk reel mower, such as a walk greensmower, having an upwardly and rearwardly extending handle assembly that is gripped by an operator who walks behind the mower. Such a walk reel mower would typically have only a single cutting unit carried at the front of the mower frame. Thus, the grass basket improvements could be used in conjunction with the greensmower shown in U.S. Pat. No. 7,191,584 incorporated by reference herein, or on similar greensmowers. Similarly, the reel cutting unit of a walk greensmower can be easily removable from the suspension, and/or the motor can be easily removable from the frame of the reel cutting unit, both as also disclosed herein.

Moreover, the various features disclosed herein need not all be used at the same time on a single mower. The mower designer can pick which features a particular mower should have on an almost ala carte basis. Thus, there are many possible permutations of features that would desirably be of interest.

Accordingly, the scope of this invention shall be limited only by the appended claims.

We claim:

1. A reel mower for cutting grass, which comprises:
   (a) a mower frame supported for rolling over the ground;
   (b) a power source carried on the mower frame;
   (c) an operator's station carried on the mower frame for supporting an operator thereon;
   (d) a plurality of reel cutting units carried on the mower; and
   (e) a suspension for operatively connecting each reel cutting unit to the mower frame, wherein the suspension includes:
      (i) at least one substantially vertical pivot joint that provides a substantially vertical pivot axis about which the reel cutting unit pivots to permit the reel cutting unit to yaw relative to the mower frame during turns of the mower frame when the reel cutting unit is in engagement with the ground in a cutting position; and
      (ii) the vertical pivot axis provided by the at least one pivot joint being inclined or canted relative to vertical at a negative angle that points rearwardly relative to the reel cutting unit and relative to vertical as one proceeds downwardly along the angle of inclination when the reel cutting unit is in engagement with the ground in a cutting position.

2. The reel mower of claim 1, wherein the at least one substantially vertical pivot joint comprises two spaced pivot joints that are coaxially aligned with one another along the vertical pivot axis.

* * * * *